(12) United States Patent
Sakuma et al.

(10) Patent No.: US 7,386,515 B2
(45) Date of Patent: Jun. 10, 2008

(54) FEE IMPOSITION SYSTEM FOR APPLICATION SOFTWARE

(75) Inventors: Toshiyuki Sakuma, Kawasaki (JP); Haruhisa Nakamura, Kamakura (JP); Masaki Honma, Showa (JP); Yuichi Kaneko, Yokohama (JP); Hirotaka Morita, Yokosuka (JP); Mitsuhiro Enomoto, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1050 days.

(21) Appl. No.: 10/207,168

(22) Filed: Jul. 30, 2002

(65) Prior Publication Data

US 2003/0055789 A1  Mar. 20, 2003

Related U.S. Application Data

(62) Division of application No. 10/100,187, filed on Mar. 19, 2002, now Pat. No. 7,065,504.

(51) Int. Cl.
*G06Q 99/00* (2006.01)
*H04K 1/00* (2006.01)

(52) U.S. Cl. .............................. 705/52; 705/51; 705/53; 705/58; 705/59; 713/165; 713/182; 380/200; 380/201; 380/202

(58) Field of Classification Search .................. 705/51, 705/52, 53, 59; 713/165, 180; 380/201, 380/202
See application file for complete search history.

(56) References Cited

U.S. PATENT DOCUMENTS

| 6,151,643 | A  | * | 11/2000 | Cheng et al. ................... 710/36 |
| 6,210,276 | B1 | * | 4/2001 | Mullins ....................... 463/27 |
| 7,065,504 | B2 | * | 6/2006 | Sakuma et al. ................. 705/52 |
| 2002/0174041 | A1 | * | 11/2002 | Grey et al. .................... 705/32 |
| 2003/0055788 | A1 | * | 3/2003 | Sakuma et al. ................. 705/52 |
| 2004/0267552 | A1 | * | 12/2004 | Gilliam et al. ................. 705/1 |

* cited by examiner

*Primary Examiner*—Firmin Backer
(74) *Attorney, Agent, or Firm*—McDermott Will & Emery LLP

(57) ABSTRACT

Fee imposition system and method for application software, in which a software providing corporation can collect the fee without fail and charge a fair fee to a customer, and thereby the customer can use the application software with a paying method easy to estimate. The fee imposition system includes a server machine installed in a management center for managing the software, a client machine installed in a customer's office and connected with the server machine through a communication means, a ticket issue unit for issuing a ticket file on the basis of a predetermined fee schedule, and a data copy/writing unit for copying data corresponding to the information designated by the ticket file from a data source memory unit and recording the copied data on a data target memory unit.

10 Claims, 23 Drawing Sheets

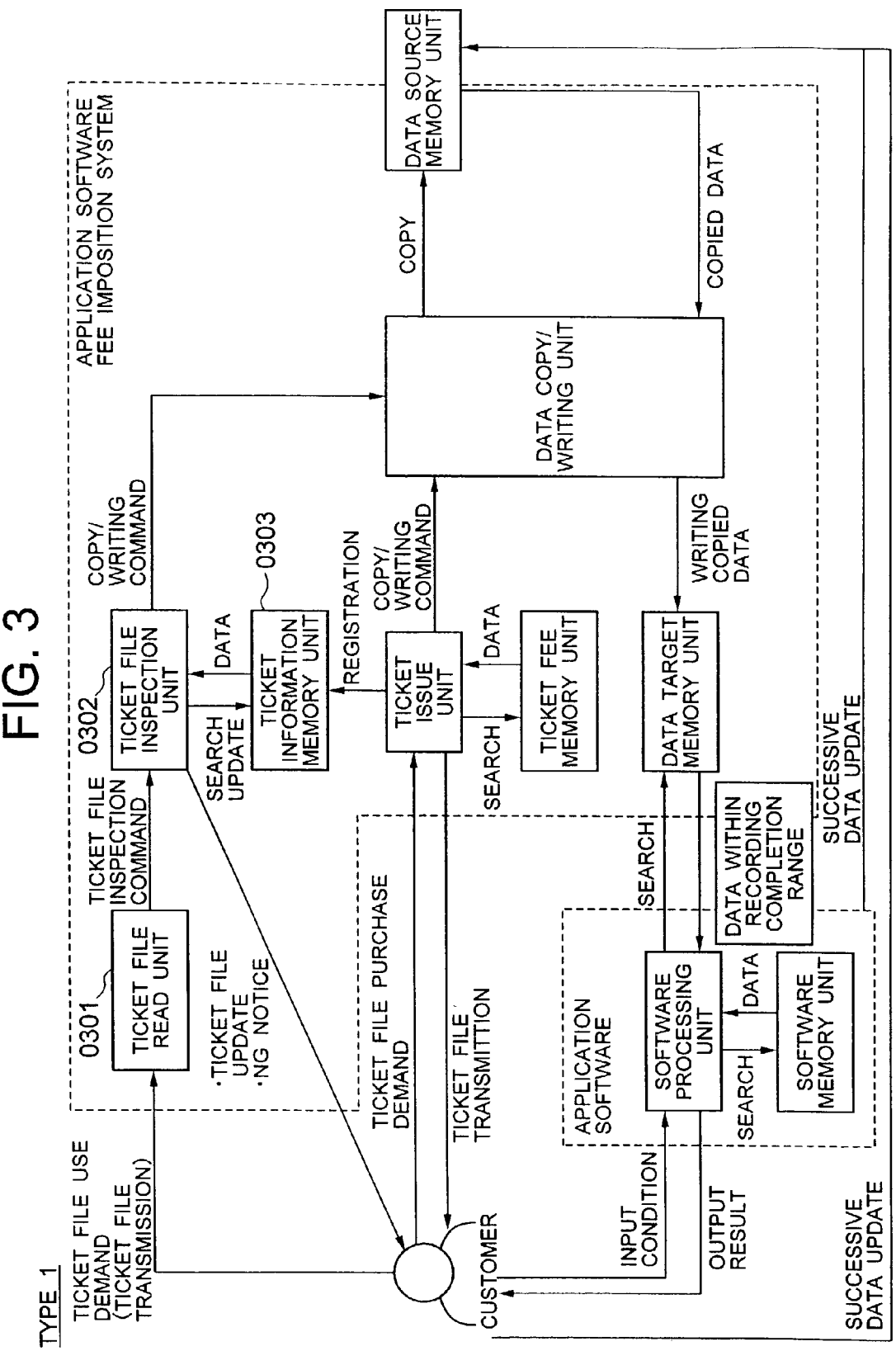

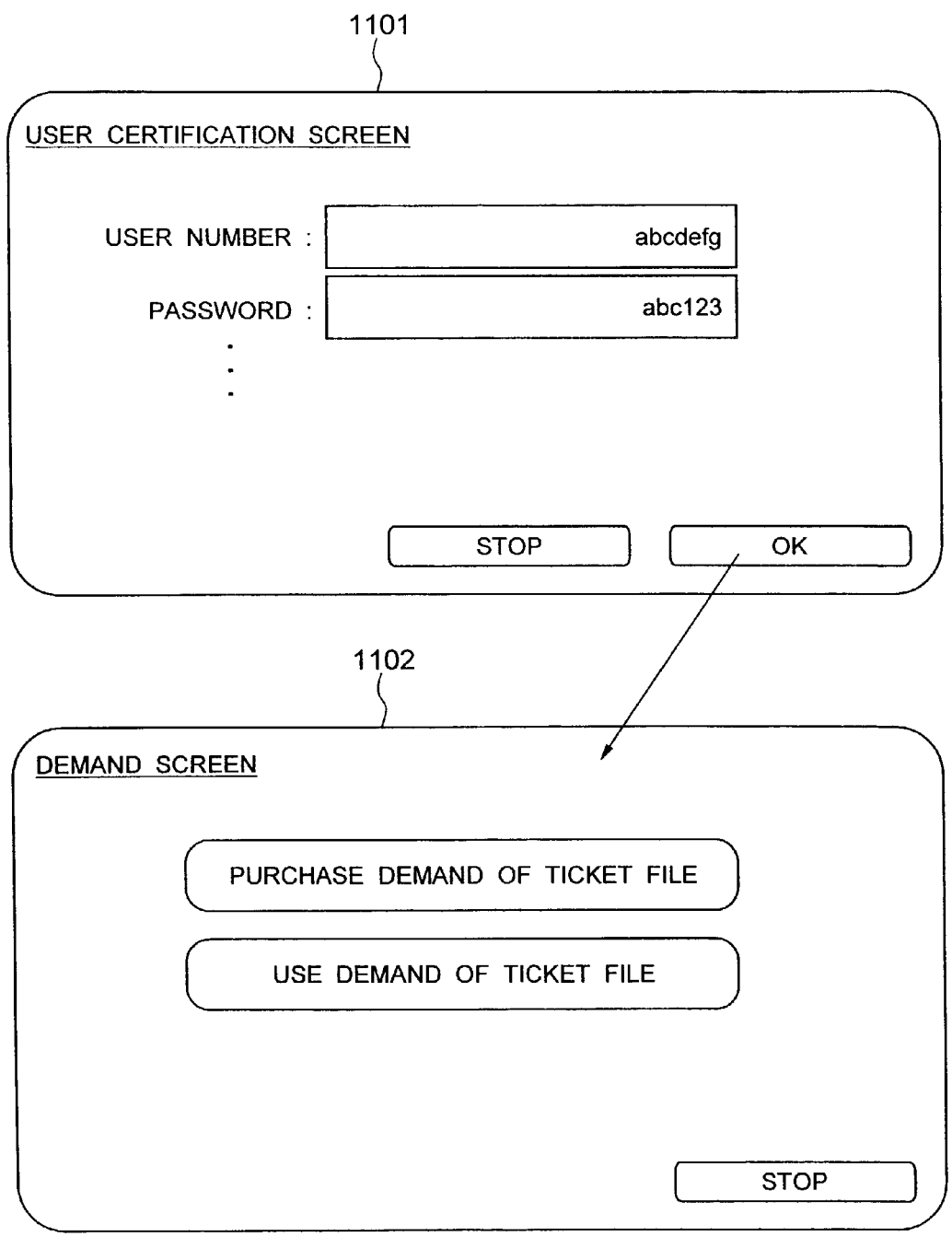

FIG. 12

TICKET FILE PURCHASE SCREEN

| No | CALCULATION METHOD | NAME OF SOFTWARE TO BE USED | TABLE DESIGNATION | RECORD RESTRICTION | ... | UNIT FEE OF PURCHASE | START DATE OF TICKET (TERM FOR USE) | REMAINING TICKET NUMBER | FEE | |
|---|---|---|---|---|---|---|---|---|---|---|
| 1 | 1B | STOCK CONTROL | NO DESIGNATION | NOTHING | ... | TEN PIECES | NO DESIGNATION (2 DAYS) | 100 PIECES | ¥2,000 | PURCHASE TICKET |
| 2 | 2 | NO DESIGNATION | NO DESIGNATION | OTHER THAN AREA II | ... | ONE PIECES | NO DESIGNATION (30 DAYS) | NO LIMITATION | ¥300 | PURCHASE TICKET |
| 3 | 1B | STOCK CONTROLLED MANUFACTURING PLAN | NO DESIGNATION | NOTHING | ... | ONE PIECES | NO DESIGNATION (7 DAYS) | TEN PIECES | ¥500 | PURCHASE TICKET |
| 4 | 1B | NO DESIGNATION | NO DESIGNATION | NOTHING | ... | ONE PIECES | NO DESIGNATION (7 DAYS) | 20 PIECES | ¥500 | PURCHASE TICKET |
| 5 | 1A | NO DESIGNATION | NO DESIGNATION | NOTHING | ... | ONE PIECES | NO DESIGNATION (1 DAY) | FIVE PIECES | ¥700 | PURCHASE TICKET |
| ... | ... | ... | ... | ... | ... | ... | ... | ... | ... | |

RETURN    CUSTOMER

FIG. 13

```
TICKET PURCHASE SCREEN FOR CUSTOMER (1) USER NUMBER :        [abcdefg]
(2) CALCULATION METHOD :
    ●TYPE 1A : USE (RESERVATION)    [RESERVATION    [2001/01/05
              SERVER MACHINE γ       STATUS]         RESERVATION OF γ1]
    ○TYPE 1B : USE EMPTY SERVER MACHINE γ
              (PARALLEL CALCULATION ACCORDING TO EMPTY STATUS)
    ○TYPE 2 : CALCULATE BY SERVER MACHINE β ONLY
(3) NAME OF USED SOFRTARE
    ○MANUFACTURING PLAN
    ●STOCK CONTROL
    ○DELIVERY SCHEME
    ...
(4) TABLE DESIGNATION :
    ●DESIGNATION        [HISTORY TABLE]           [ASSUMPTION TABLE]
    ○NO DESIGNATION (HISTORY TABLE ONLY)
(5) RECORD RESTRICTION :
    DESIGNATION         [              ]  ~  [              ]
    ●FIXING (a : TWO YEARS BEFORE [1999/01/01], b : TWO YEARS LATER[2003/01/01])
        ○AREA I   (LESS THAN a)      : USED IN INSPECTING EXACTNESS OF
                                       PRESUMPTION
        ●AREA II  (BETWEEN a AND b)  : USED IN STOCK PRESUMPTION AND
                                       STOCK MINOR PLAN
        ○AREA III (MORE THAN b)      : USED IN STOCK MAJOR PLAN
    ○NONE
(6) COLUMN          ○YES    [              ]    ●NO
    RESTRICTION
(7) DATA USE TERM   ●DESIGNATION [2001/04/12]   ○FIXED (ONE MONTH)
(8) NOTICE TERM     ●YES                        ○NO
    IMPENDENCE
(9) NOTICE TIMING   ○DESIGNATION [yyyy/mm/dd]   ●FIXED (ONE DAY BEFORE
                                                        RESTRICTION
(10) DATA UPDATE    ●YES                        ○NO
(11) DATA UPDATE    ○DESIGNATION [          ]   ●FIXED (TEN TIMES)
     NUMBER
(12) AFTER          ○IMMEDIATE USE              ●LATER USE
     PURCHASING
     TICKET

[ RETURN ]   [ FEE CALCULATION ]   [ TICKET PURCHASE ]
```

FIG. 14

SERVER MACHINE γ RESERVATION STATUS SCREEN

| DATE | γ1 (HIGH PERFORMANCE MACHINE) | γ2 (HIGH PERFORMANCE MACHINE) | γ3 (HIGH PERFORMANCE MACHINE) | ... | γ1 (MIDDLE PERFORMANCE MACHINE) | ... |
|---|---|---|---|---|---|---|
| 2001/01/01 | RESERVATION COMPLETETION | RESERVATION COMPLETETION | EMPTY SPACE | ... | EMPTY SPACE | ... |
| 2001/01/02 | RESERVATION COMPLETETION | RESERVATION COMPLETETION | RESERVATION COMPLETETION | ... | EMPTY SPACE | ... |
| 2001/01/03 | RESERVATION COMPLETETION | RESERVATION COMPLETETION | EMPTY SPACE | ... | EMPTY SPACE | ... |
| 2001/01/04 | RESERVATION COMPLETETION | RESERVATION COMPLETETION | RESERVATION COMPLETETION | ... | EMPTY SPACE | ... |
| 2001/01/05 | RESERVATION DEMAND | EMPTY SPACE | RESERVATION COMPLETETION | ... | RESERVATION COMPLETETION | ... |
| 2001/01/06 | EMPTY SPACE | EMPTY SPACE | EMPTY SPACE | ... | RESERVATION COMPLETETION | ... |
| ... | ... | ... | ... | ... | ... | ... |

RETURN    OK

FIG. 15

TICKET FEE

TOTAL AMOUNT OF TICKET FEE     : 2,226

(SPECIFICATION)

DATA COPY/WRITING FEE (TYPE 1A)   : 1,000

DATA READ ALLOWANCE FEE (TYPE 2)  : 1,010

TERM IMPENDENCE NOTICE FEE     : 10

DATA UPDATE FEE                  : 100

CONSUMPTION TAX                 : 106

[ RETURN ] [TICKET PURCHASE]

FIG. 16

TICKET FILE

TICKET FILE NUMBER : 000001

| | |
|---|---|
| (1) USER NUMBER | : abcdefg |
| (2) CALCULATION METHOD | : TYPE 1A (2001/01/05) |
| (3) NAME OF USED SOFTWARE | : STOCK CONTROL |
| (4) TABLE DESIGNATION | : STORAGE/DELIVERY HISTORY TABLE |
| | : STORAGE/DELIVERY ASSUMPTION TABLE |
| (5) RECORD RESTRICTION | : FIXED (AREA II) |
| | (1999/01/01~2003/01/01) |
| (6) COLUMN RESTRICTION | : NO |
| (7) DATA USE TERM | : DESIGNATION (2001/04/12) |
| (8) TERM IMPENDENCE NOTICE | : YES |
| (9) NOTICE TIMING | : FIXED (ONE DAY BEFORE RESTRICTION) |
| (10) DATA UPDATE | : YES |
| (11) DATA UPDATE NUMBER | : FIXED (TEN TIMES) |
| (12) AFTER PURCHASING TICKET | : LATER USE |

◎TOTAL AMOUNT OF TICKET FEE     : ¥2,226
  (SPECIFICATION)

・DATA COPY/WRITING FEE (TYPE 1A)    : ¥1,000

・DATA READ ALLOWANCE FEE (TYPE 2A) : ¥1,010

・TERM IMPENDENCE NOTICE FEE       : ¥10

・DATA UPDATE FEE                   : ¥100

・CONSUMPTION TAX                : ¥106

```
DATA UPDATE SCREEN

TICKET FILE NUMBER : 000002

(1) USER NUMBER              : abcdefg
   (2) CALCULATION METHOD       : TYPE 1B
   (3) NAME OF USED SOFTWARE    : STOCK CONTROL
   (4) TABLE DESIGNATION        : STORAGE/DELIVERY
                                    HISTORY TABLE
                                  : STORAGE/DELIVERY
                                    ASSUMPTION TABLE
   (5) RECORD RESTRICTION       : FIXED (AREA II)
                                  (1999/01/01~2003/01/01)
   (6) COLUMN RESTRICTION       : NO
   (7) DATA USE TERM            : DESIGNATION (2001/04/12)
   (8) TERM IMPENDENCE NOTICE   : YES
   (9) NOTICE TIMING            : FIXED (ONE DAY BEFORE
                                    RESTRICTION)
   (10) DATA UPDATE             : YES
   (11) DATA UPDATE NUMBER      : FIXED (TEN TIMES)
   (12) AFTER PURCHASING TICKET : IN USE

[ RETURN ]   [ DATA UPDATE ]
```

FIG. 19

◎STORAGE/DELIVERY HISTORY TABLE

| RECORD NO. | COMPONENT NUMBER | STORAGE/ DELIVERY DETERMINATION | DATE/TIME | AMOUNT | . . . |
|---|---|---|---|---|---|
| 1 | a01 | 1 | 1990/01/01 | 20 | |
| ⋮ | ⋮ | ⋮ | ⋮ | ⋮ | |
| i | a01 | 1 | 1999/01/01 | 7000 | |
| ⋮ | ⋮ | ⋮ | ⋮ | ⋮ | |
| n | z99 | 1 | 2000/12/31 | 500 | |

◎STORAGE/DELIVERY ASSUMPTION TABLE

| RECORD NO. | COMPONENT NUMBER | STORAGE/ DELIVERY DETERMINATION | DATE/TIME | AMOUNT | . . . |
|---|---|---|---|---|---|
| 1 | a01 | 1 | 2001/01/01 | 400 | |
| ⋮ | ⋮ | ⋮ | ⋮ | ⋮ | |
| i | a01 | 1 | 2003/01/01 | 100 | |
| ⋮ | ⋮ | ⋮ | ⋮ | ⋮ | |

○DATA AREA UNIT FEE TABLE

| AREA | RANGE | UNIT FEE | USE PURPOSE | ... |
|---|---|---|---|---|
| I | LESS THAN a | 0.36 | USED IN INSPECTING EXACTNESS OF PRESUMPTION | |
| II | BETWEEN a AND b | 1.01 | USED IN STOCK PRESUMPTION AND STOCK MINOR PLAN | |
| III | MORE THAN b | 0.63 | USED IN STOCK MAJOR PLAN | |

FIG. 22

◎UNIT FEE TABLE ACCORDING TO MACHINE PERFORMANCE

| MACHINE PERFORMANCE | UNIT FEE |
|---|---|
| HIGH PERFORMANCE | 1000 |
| MIDDLE PERFORMANCE | 500 |
| ... | |

◎UNIT FEE TABLE FOR TERM INPNEDENCE NOTICE

| NOTICE TERM IMPENDENCE EXISTENCE | UNIT FEE |
|---|---|
| YES | 10 |
| NO | 0 |
| ... | |

◎UNIT FEE TABLE FOR DATA UPDATE

| DATA UPDATE NUMBER | UNIT FEE |
|---|---|
| BETWEEN ONE TIME AND 100 TIMES | 10 |
| ... | |

FEE IMPOSITION SYSTEM FOR APPLICATION SOFTWARE

RELATED APPLICATION

This application is a divisional of U.S. patent application Ser. No. 10/100,187, filed Mar. 19, 2002 now U.S. Pat. No. 7,065,504.

BACKGROUND OF THE INVENTION

1. Field of the Invention

The present invention relates to a method for providing use of application software. More particularly, the present invention relates to a technology for imposing fee on the use of the application software, and especially to a system, method, program and a medium for recording the program, which impose fee upon software used for helping analyze great quantity of data and helping decision-making, such as an Enterprise Resource Planning ERP package or a Supply Chain Planning SCP package.

2. Description of the Related Art

Recently, application softwares for helping analyze great quantity of data and helping decision-making, such as an Enterprise Resource Planning ERP package or a Supply Chain Planning SCP package, are being distributed in the market. For the use of such softwares, four kinds of methods have been proposed as follows. The first method is to purchase the software recorded in a recording medium such as floppy disks FD or a compact disks CD, which is so called a 'product purchasing method'. The second method is to pay a certain amount of rental fee to the corporate providing the software by a regular period such as monthly without purchasing the software, which is so called a 'product rental method'. The third method is to pay a certain amount of usage fee to the corporate providing the software by a regular period without purchasing the software, which is so called a 'fixed service fee imposing method'. The fourth method is to pay a flexible amount of fee, which is imposed on the basis of the time and the frequency of use of the software, to the corporate providing the software without purchasing the software, which is so called a 'specific service fee imposing method'.

According to the recent trend that the business environment changes rapidly, in order to reduce costs caused by the possession of something, the customer enterprises are increasing that use the application software providing a rapid service with low costs through an out sourcing service provided by an application service provider ASP. Consequently, such customer enterprises pay for the software according to the 'fixed service fee imposing method' or 'specific service fee imposing method', or according to both of the methods in combination.

Among those methods, the customer enterprises tend to prefer the 'fixed service fee imposing method' or the combination of the 'fixed service fee imposing method' and the 'specific service fee imposing method' in the point that such methods are more useful to make an estimate.

However, the 'fixed service fee imposing method' does not determine the fee on the basis of the substantial use of the software. Thus, it is advantageous for the customer enterprise, which uses the software frequently or for a great deal of time, but disadvantage for the customer enterprise not doing so. For that reason, that method would be unfair.

Furthermore, in the case of the combination of the 'fixed service fee imposing method' and the 'specific service fee imposing method', the use fee becomes inevitably a deferred payment. For such a reason, the corporation providing the software is usually burdened with a risk in collecting the fee.

SUMMARY OF THE INVENTION

The present invention has been proposed to overcome the above-described problems, and accordingly, it is the object of the present invention to provide system and method for imposing fee to the use of an application software, which provides advantages that the corporation providing the software can collect the fee without any risk and charge the customer enterprises for the fee fairly, and accordingly, the customer enterprise can use the application software with a paying method easy to make an estimate.

In order to achieve the above-described object, the present invention provides a fee imposition system for application software in which the application software is executed based on a plurality of tables, comprising: an input means for inputting a name of software that a customer wants to use, and a name of a table that the customer wants to use while using the software; a ticket file issue means for issuing a ticket file based on a predetermined fee schedule according to a kind of the software and the table, and transmitting the ticket file to a client machine; and a data copy/writing means for copying data of the designated table from a data source memory unit storing a plurality of the tables, and writing the data of the designated table on a data target memory unit, based on information designated by the ticket file.

And, in order to achieve the above-described object, the present invention provides a fee imposition system, wherein the input means receives an input about a designation of a record range or a data amount in regard to the table that the customer wants to use, and wherein the ticket file issue means issues the ticket file according to information about the designation of the record range or the data amount.

Further, in order to achieve the above-described object, the present invention provides a fee imposition system, comprising a ticket file inspection means for receiving the ticket file from the client machine, combining the received ticket file with a data of the ticket file recorded in a ticket information memory unit, and sending a copy/writing command to the data copy/writing means in case the received ticket file is a normal one.

Further, in order to achieve the above-described object, the present invention provides a fee imposition system, comprising a processing means for receiving the ticket file from the client machine and executing the software corresponding to the ticket file, wherein, the processing means updates the ticket file with reference to a data update number when a data recorded in the data source memory unit is updated as the software is executed, records the updated ticket file on a ticket information memory unit, and transmits the ticket file to the client machine.

Other objects, features and advantages of the invention will become apparent from the following description of the embodiments of the invention taken in conjunction with the accompanying drawings.

BRIEF DESCRIPTION OF THE DRAWINGS

FIG. 3 shows an example of using a ticket file;

FIG. 11 shows an output screen of a client machine;

FIG. 12 shows an output screen of the client machine for purchasing the ticket file;

FIG. 13 shows an output screen of the client machine for purchasing the ticket file;

FIG. 14 shows an output screen displayed when there is no reservation;

FIG. 15 shows the detailed statement of fee for the ticket file;

FIG. 16 shows the contents of the ticket file;

FIG. 18 shows a screen for transmitting data update information to the client machine;

FIG. 19 shows the range of record restriction given to a table;

FIG. 22 is a table showing an example of other imposing items regarding to the use of the stock control software.

DETAILED DESCRIPTION OF THE EMBODIMENT

The present invention will hereinafter be described in more detail by the preferred embodiment of the invention.

In the description of the present invention, the entire construction of a fee imposition system for application software, which is used for providing the application software, is described first with reference to FIGS. 1 through 19, and stock amount control software is described as an, example of the application software with reference to FIGS. 20 through 23.

At first, an embodiment of the application software fee imposition system is described in detail.

(1) Hardware Construction of the Application Software Fee Imposition System

Figure 1:
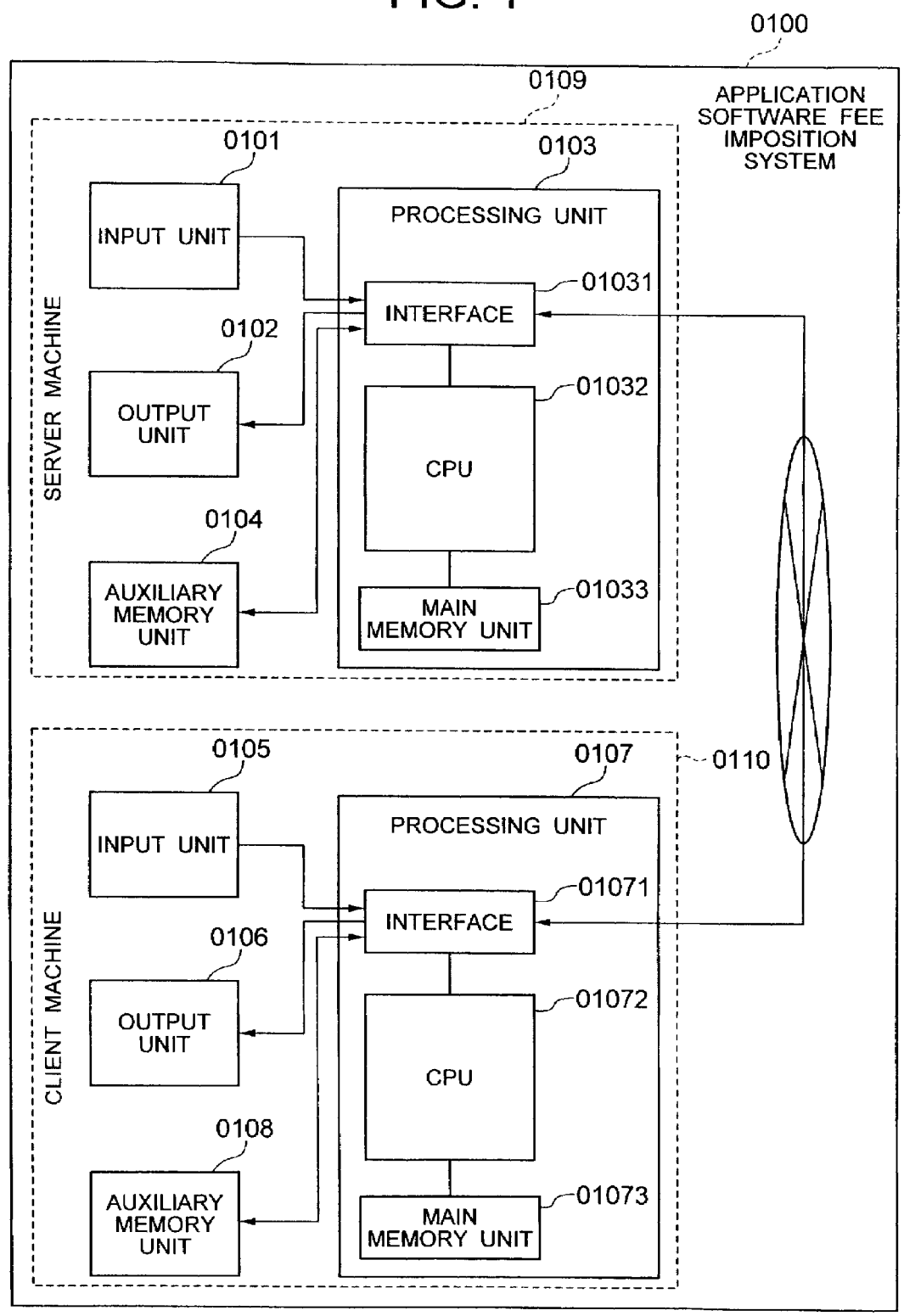
FIG. 1 shows the configuration of hardware of an application software fee imposition system according to the present invention.

The application software fee imposition system 0100 according to the present embodiment is, as shown in FIG. 1, comprised of a server machine 0109 possessed by the ASP, and a client machine 0110 possessed by a user. The server machine 0109 has an input unit 0101, an output unit 0120, a processing unit 0103 and an auxiliary memory unit 0104, and provides the application software such as the ERP package software. The client machine 0110 has an input unit 0105 and an output unit 0106 connected with the server machine 0109 through a communication means, a processing unit 0107, and an auxiliary memory unit 0108 for the client machine 0110 using the application software such as the ERP package software. Here, a plurality of server machines can be equipped, and a plurality of client machines can be equipped, too. Furthermore, in the present embodiment, the application software may include only the, units in the server machine performing the fee imposing process of the present invention, not limited to the case of including both the server machine and the client machine.

The input unit 0101 is a device for receiving an input from such as buttons displayed on an installation screen of the application software (e.g. stock amount control software described later), and includes a keyboard and a mouse.

The output unit 0102 is a device for outputting the installation screen etc., and is equipped with a display screen.

The processing unit 0103 has an interface 01031, a central processor unit CPU 01032 and a main memory unit 01033. The processing unit 0103 performs the fee imposing process according to the present invention, and drives application software. The processing unit 0103 is connected with the input unit 0101, the output unit 0102 and the auxiliary memory unit 0104 through the interface 01031.

The input unit 0105 is a device for receiving an input to execute the application software, and has a keyboard and a mouse.

The output unit 0106 is a device for outputting the output display in the fee imposing process of the present invention, and is equipped with a display screen.

The processing unit 0107 has an interface 01071, a central processor unit CPU 01072 and a main memory unit 01073. The processing unit 0107 is connected with the input unit 0105, the output unit 0106 and the auxiliary memory unit 0108 through the interface 01071.

(2) Functional Construction of the Application Software Fee Imposition System

The fee imposition system according to the present embodiment issues electrical "ticket files" through the communication means such as a network, to the customers who want to use the application software provided by the ASP. As the customers purchase the ticket files, the fee imposition process is performed before using the application software. The customers can use the application software depending on the contents of the ticket files or within the range limited by the ticket files.

At first, the functional construction of the present system in a step of purchasing the ticket files is described with reference to FIGS. 2A and 2B.

Figure 2A:
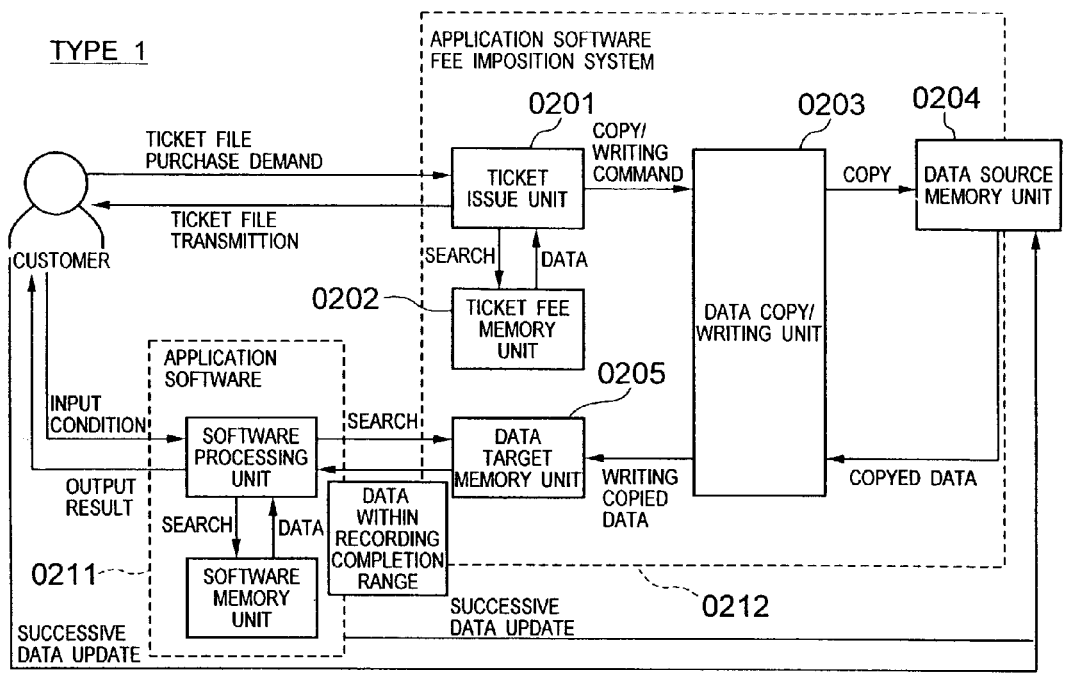
FIGS. 2A and 2B show a data access restriction method of the application software fee imposition system.
Figure 2B:
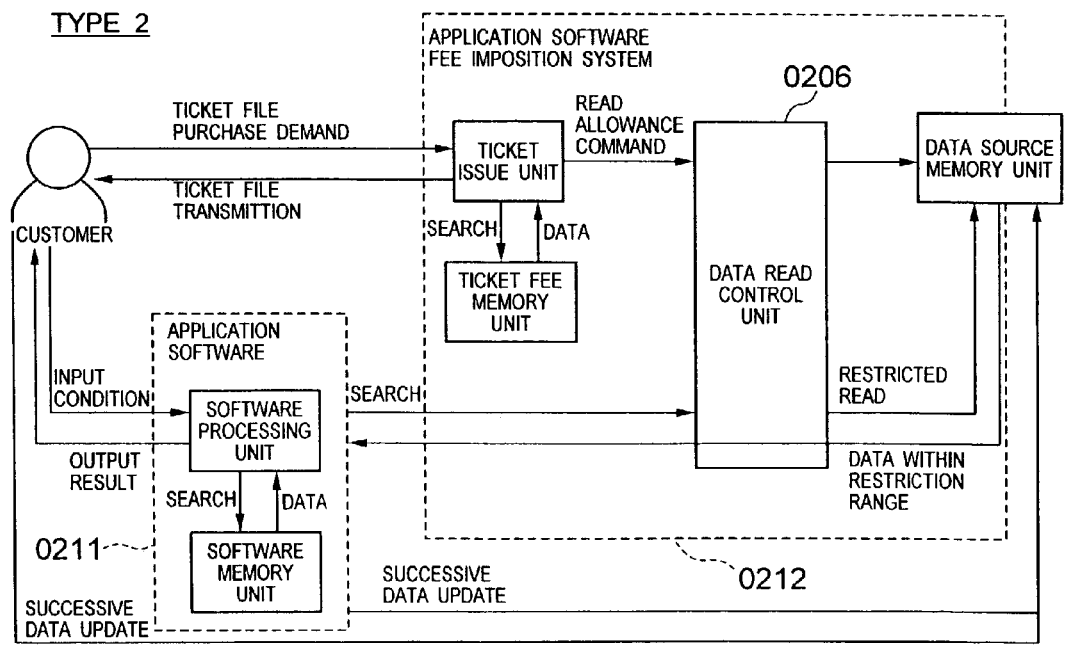

In FIGS. 2A and 2B, the method that the customer purchases the ticket file is classified into two types in view of the method for confining the kind of data or the amount of data for using the application software. The TYPE 1 is a method to copy the data used by the customer for executing the application software from a data source memory unit 0204 to a data target memory unit 0205, and then impose the fee in accordance with the type of the data or the amount of the data. By copying merely the data required by the customer from the data source memory unit 0204 to the data target memory unit 0205, and using the data recorded in the data target memory unit 0205 to execute the application software, the restriction of the data access is realized.

The customer accesses the application software fee imposition system 0212 through the network, and then transmits the information (the purchase demand information of the ticket file) about the desired application software or about the type or the amount of the data used in the application software. The ticket issue unit 0201 that receives the purchase demand information of the ticket file from the customer issues the electrical ticket file as shown in FIG. 16 by referring to a fee database (which is a fee schedule of the ASP) in the ticket fee memory unit 0202, and then transmits the issued ticket file to the customer's client machine. In addition to the issuing process, the ticket issue unit 0201 can send the data copy/writing command to a data copy/writing unit 0203. Here, the data copy/writing command is a command that makes the data used in executing the application software regarding to the ticket file available. More particularly, the data copy/writing command is a command that instructs to copy the data about the kind of the data required by the customer when the ticket was purchased, or the data within the allowed amount of data, from the data source memory unit 0204 to the data target memory unit 0205. When the application software is used simultaneously with the issue of the ticket file, the copy/writing command can be transmitted to the data copy/writing unit 0203 simultaneously with the issue of the ticket file. Furthermore, if the use of the ticket file, which means the use of the application software, is to be performed later, the corresponding command can be sent at the time that the application software is used. The copy/writing command also can be implemented by transmitting the issued ticket file to the data copy/writing unit 0203. As the corresponding copy/writing command is received, the data copy/writing unit 0203 sends the copy/writing command to the data source memory unit 0204. The data copy/writing unit 0203 has the function of transmitting the data corresponding to the type of data required by the customer to the data target memory unit 0205. Here, the data source memory unit 0204 is a part of the present invention even in the case of the auxiliary memory unit 0108 of the client machine of the customer or in the case of the auxiliary memory unit 0104 of the server machine. According to the application software, the data source memory unit 0204 can be installed in the client machine if the customer enterprise utilizes the data accumulated by itself, and can be installed in the server machine of the ASP if the data is a common data known to the industry generally. In the present embodiment, the data source memory unit 0204 is explained to be included in the auxiliary memory unit 0104 of the server machine, for example.

After the required data is copied, the customer can use the application software on the basis of the contents of the ticket file. The customer inputs commands required for executing the application software, and the software processing unit (which corresponds to the processing unit 0103) of the server machine drives the corresponding application software (for example, a stock control software which will be described later) read from a software memory unit (a part of the auxiliary memory unit 0104). The data, which can be referred to when the application software is executed, is the data recorded in the data target memory unit 0205. The operation result of the application software is output to the output unit 0106 of the client machine through the network. Even in both cases that the data source memory unit 0204 is in the server machine of the ASP or in the client machine of the customer, the customer can successively update and amend the data of its own according to the output result of the application software. As described later, in correspondence to the data update of the data source memory unit 0204, in the present embodiment, the data of the data target memory unit 0204 can be updated or also can be maintained according to the selection of the customer. The number of update of the data source memory unit 0205 is also an element to be considered for a fair imposition of fee as long as the application software provided by the ASP is used, and that can be one of the information about the purchase demand of the ticket file proposed by the customer. (See FIG. 16) Owing to the update function, the customer can execute the application software again with the recent data.

As described above, a fair imposition of fee according to the type of the data or the amount of the data can be achieved by physically dividing the data source memory unit 0204 where the customer's data is stored, from the data target memory unit 0205 used when the application software is used.

In the hardware construction shown in FIG. 1, the processing unit 0103 performs the functions of the ticket issue unit 0201, the data copy/writing unit 0203 and the software processing unit.

The TYPE 2 shown in lower area of FIG. 2 is another method, where the data access is performed with respect to the data source memory unit 0204 when the customer uses the application software. In this method, the access is confined on the basis of the ticket file, and the fee is imposed on the basis of the kind of data or the amount of data that the access thereto is allowed. The data source memory unit 0204 can be accessed in regard to the data (the data within a restricted range) required by the customer, and the data access is confined without the data target memory unit, which was used in TYPE 1.

First, the customer accesses the application software fee imposition system 0212 through the network, and transmits the purchase demand information of ticket file as in the TYPE 1. The application software fee imposition system 0212, which receives the purchase demand, issues the electrical ticket file to the customer as in the TYPE 1, and transmits the issued ticket file to the client machine through the network. In the TYPE 2, in addition to issuing the ticket file, the ticket issue unit 0201 sends a read allowance command to the read control unit 0206. Here, the read allowance command is a command that allows the access to the data source memory unit 0204 in regard to the kind of data allowed to be accessed or within the range of the allowed amount of data (limited range of data) designated by the ticket file. The data read control unit 0206 has the functions to receive the corresponding read allowance command and to control the data access under the restriction of the term or the time of allowance designated by the ticket file, and especially has the function to control the restricted reading of the data with respect to the data source memory unit 0204 when the application software is used. The timing to send the read allowance command is not limited to the case that the read allowance command is sent simultaneously with the issue of the ticket file, and, it is possible to send the read allowance command when the application software is used, that is, when the ticket file is transmitted from the client machine. Moreover, the ticket file can be used as the corresponding command, which is the same as the case of TYPE 1. The data read control unit 0206 has the function to determine 'read impossible' if the condition designated by the ticket file such as a data maintenance term is not met.

After the read allowance with respect to the required data, the customer can use the application software according to the contents of the ticket file. As the case of TYPE 1, the customer inputs commands required for driving the application software, and the software processing unit (which corresponds to the processing unit 0103) drives the corresponding application software read from the memory unit. (which is a part of the auxiliary memory unit 0104) The data, which can be referred to while the application software is being executed, is the data that is access-allowed among the data recorded in the data source memory unit 0204. The result of the operation of the application software is output to the client machine of the customer through the network.

As the access to the data source memory unit 0204 is restricted by the function of the data read control unit 0206, the fair fee imposition can be realized in using the ASP according to the kind of or the amount of the date used in executing the application software.

In such a situation, the software processing unit shown in FIG. 2A, for example, in the stock control system described below, corresponds to a module for processing the judgment of a proper amount of stock, the diagnosis of the present status of the stock, the calculation of deficiency or surplus amount of the stock, and the drafting of an improving method of the stock management. The software module is prerecorded in the auxiliary memory unit 0104 of the server, however, when the application software is executed, the software module is recorded in the main memory unit 01033 and then is executed by the CPU 01032. Furthermore, the software memory unit 0211 shown in FIG. 2A, for example, in the stock control system described below, corresponds to the regulation program for judging a proper amount of stock, and diagnosing the present state of the stock and a data relating to the stock used for calculating deficiency or surplus amount of the stock, and judging a proper amount of stock. The software memory unit 0211 is in the auxiliary memory unit 0104 of the server.

Furthermore, in the present embodiment, the processing result of the application software is recorded in the recording area provided in the main memory unit 01033 of the server machine, and the processing result of the client machine is recorded in the recording area provided in the main memory unit 01073. Each part constituting the processing unit is maintained in the auxiliary memory unit in advance, and it is realized when the CPUs 01032 and 01072 drive the read program. However, the scope of the present invention is not limited to such general information processing device and software. For example, the present invention can be realized using a hardware including a hard-wired logic for performing the processes of the respective parts illustrated hereinafter, or using such hardware and a general information processing device programmed in advance.

Figure 7:
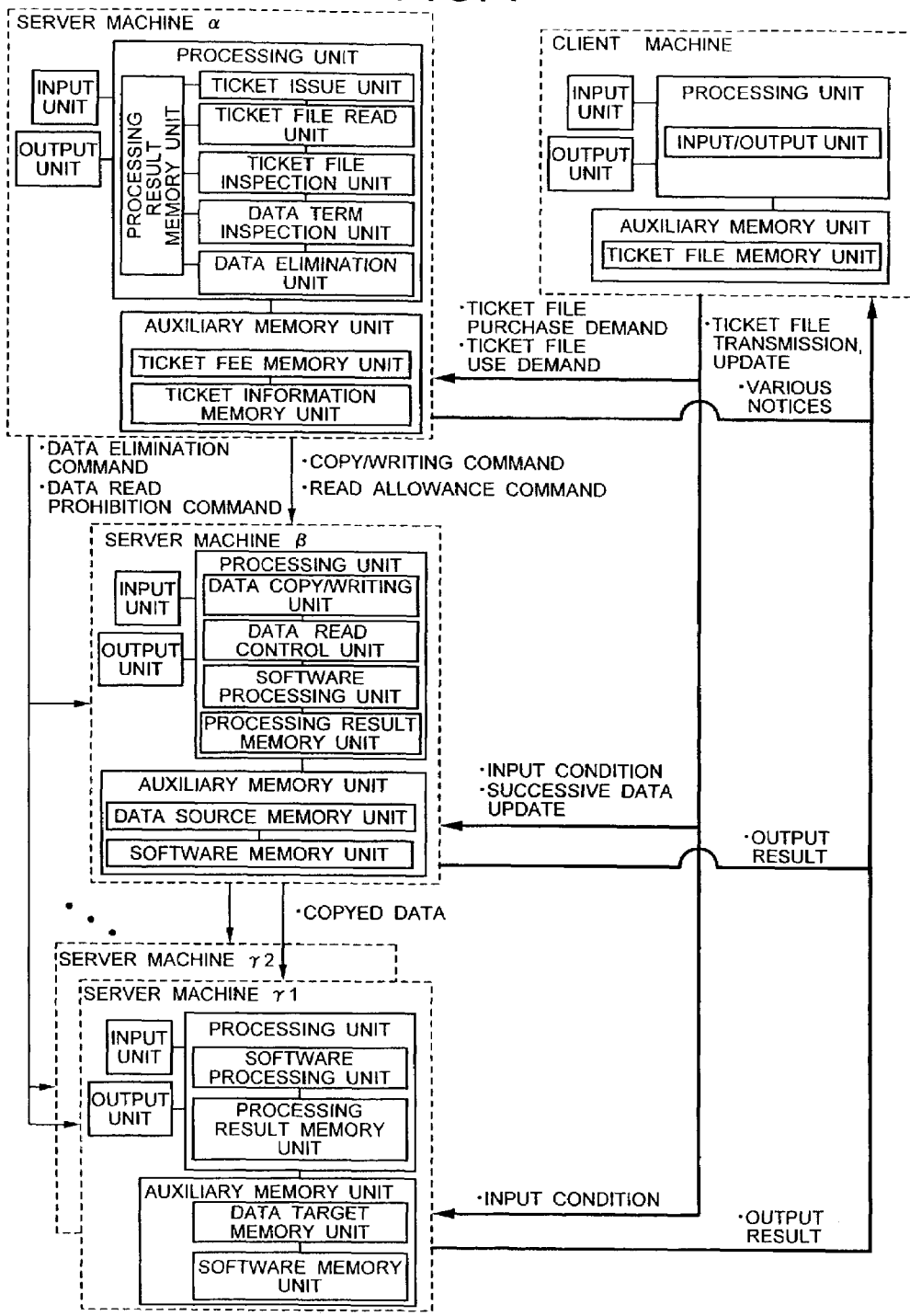
FIG. 7 shows the configuration of the hardware in case the application software fee imposition system is comprised of a plurality of servers.

The auxiliary memory unit 0104 of the server machine has, as shown in FIG. 2A, a ticket fee memory unit 0202, a data source memory unit 0204, a data target memory unit 0205 and a software memory unit. And, the auxiliary memory unit 0108 of the client machine has, as shown in FIG. 7, a ticket file memory unit.

The data source memory unit 0204 and the data target memory unit 0205 are data recording units used by the application software, and they correspond, for example, to a stock-related data memory unit 0218 and a driving data memory unit 0225 in the stock control system described below.

The embodiment of the present invention about the process of using the-ticket file is described in detail with reference to FIGS. 3 and 4.

FIG. 3 shows an embodiment when the ticket file is used according to the above-described TYPE 1.

The same processes illustrated in FIG. 2A can be realized by the same functions.

When the customer uses the ticket file issued according to TYPE 1, the information about the "ticket file use demand" is transmitted from the client machine to the server machine through the network. The use demand can be realized by sending the ticket file retained preliminarily by the customer. The application software fee imposition system 0212 that received the ticket file reads the ticket file by using the function of the ticket read unit 0301, and sends a ticket file inspection command to a ticket file inspection unit 0302. As the command is received, the ticket file inspection unit 0302 inspects the ticket file. As the inspection process, an authenticity inspection for inspecting whether the ticket file is the one issued by the application software fee imposition system run by the ASP, an inspection for determining whether the validity term of the ticket file has expired, or an inspection for determining whether the data update number or the data maintenance term of the application software designated by the ticket file has exceeded, is performed by the processing of the CPU 01032. The inspection process is performed by comparing the data recorded in the ticket information memory unit 0303 of the customer, with the data in the auxiliary memory unit 0104 of the server machine. The ticket file of the customer is registered in the ticket information memory unit 0303 in advance, in accordance with the issuing process of the ticket file of the ticket issue unit 0201.

If the above items are determined as NG in the inspection process, an NG notice is transmitted to the client machine of the customer through the network. The ticket file inspection unit 0302 has the function of updating the recent information of the ticket information memory unit 0303, as the ticket file is used or the application software is received. Further, since the ticket file recorded in the ticket information memory unit 0303 and the ticket file retained by the customer have to be maintained to be identical to each other, the ticket file inspection unit 0302 transmits the updated ticket file to the client machine when the ticket file is used, or transmits a change command information having the function to update the ticket file retained by the customer.

In case the ticket file inspection unit 0302 passes the inspection, the process after the inspection differs between the case the ticket file is firstly used and the case the ticket file is used for more than two times.

If it is the first time to use the ticket file, a command (copy/writing command) for copying the data which corresponds to the kind of data or the amount of data designated by the ticket file, that is, the data used by the application software under a predetermined restriction, from the data source memory unit 0204 to the data target memory unit 0205, is transmitted to the copy/writing unit 0203. The flow for executing the application software thereafter is the same as that of FIG. 2A.

In case the same ticket file is used for more than two times, if the data that the customer uses is recorded in the data target memory unit 0205 already, there is no need to copy additionally. Furthermore, there is also no need to copy for more than the two times of use even in case the data has been updated in the data source memory unit 0204 when the ticket file has been used previously, if both of the data source memory unit 0204 and the data target memory unit 0205 are being updated when the ticket file has been used previously. If the data update of the data source memory unit 0204 is performed in real-time, the data of the data target memory unit 0205 is updated (copied) by sending the copy/writing command before the application software is executed more than two times. The functions thereafter can be realized by the same method shown in FIG. 2A.

Figure 4:
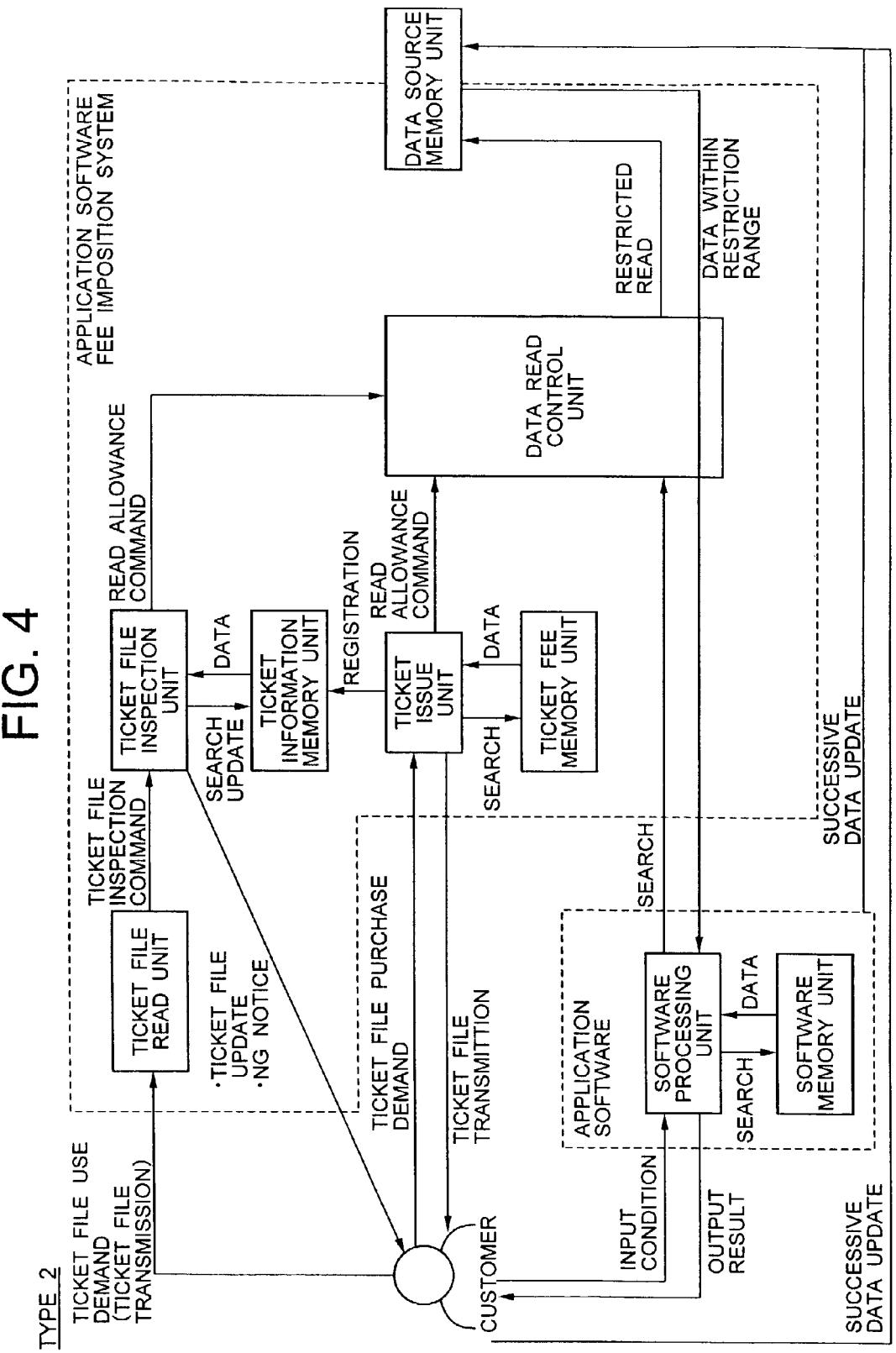
FIG. 4 shows another example of using the ticket file.

FIG. 4 shows the embodiment when the ticket file is used according to TYPE 2.

The same flow with FIG. 3 is performed until the ticket file is transmitted from the customer and then is inspected. If the ticket rile is firstly used, the ticket file inspection unit 302 controls the data read control unit 0206 by sending a read allowance command (to allow reading within a restricted range), and the data read control unit 0205 makes it possible to read the data with respect to the data target memory unit 0205 within the restricted range designated by the ticket file. If the read allowance state is maintained, when the ticket file is used more than two times, the read allowance command doesn't have to be sent to the data read control unit 0205 after the ticket file is inspected. To enhance the stability of data access, if the read allowance status is revoked by the log-out after the previous use of the ticket file, the ticket file inspection unit 0302 sends the read allowance command so that the customer can access the data source memory unit 0204, whenever the ticket file is used more than two times.

Figure 5:
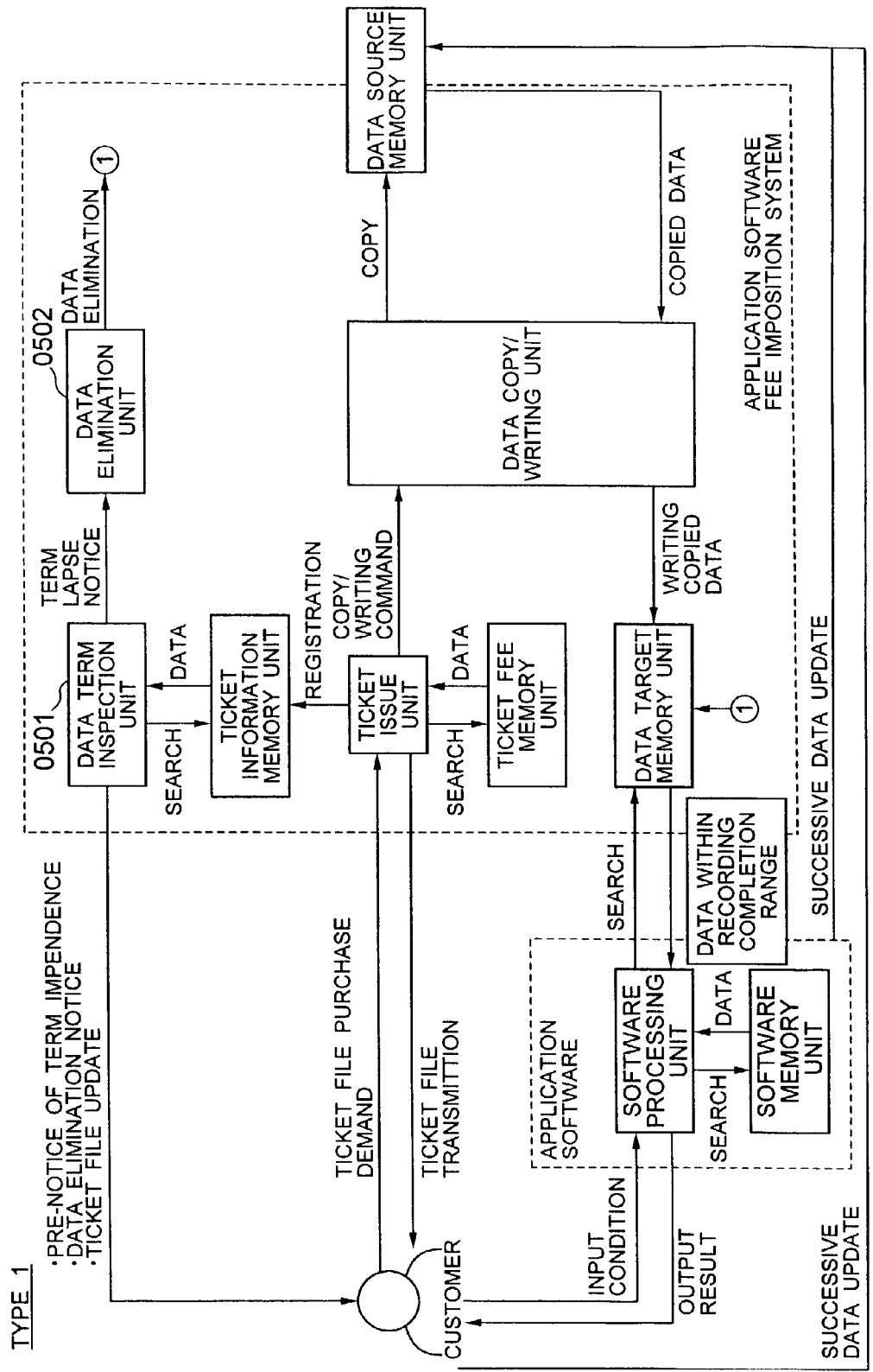
FIG. 5 shows an example of a data elimination process.
Figure 6:
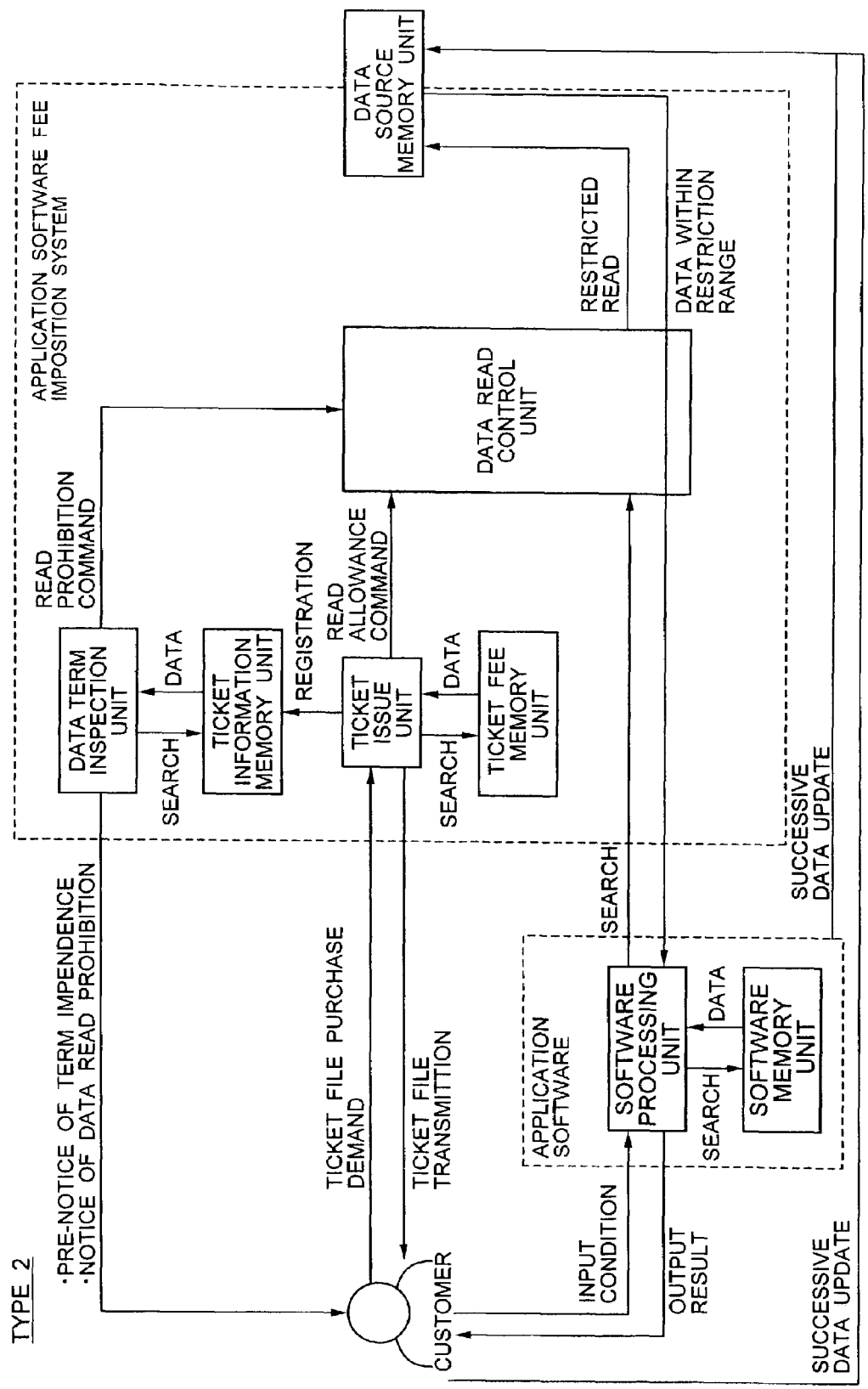
FIG. 6 shows an example of a data access restriction process.

Next, referring to FIGS. 5 and 6, an embodiment of the present invention in regard to the data elimination function or the access-prohibition function in case the ticket file is invalidated is described.

FIG. 5 shows the process of eliminating the data in case the ticket file is invalidated, with the example of the validity term for the use of the data. Here, the validity term means the period of maintaining the data or lie file designated by the ticket file in the data target memory unit 0205 in the auxiliary memory unit 0104 of the server machine, which is the item that the customer can designate when purchasing the ticket file.

In the application software fee imposition system, the ticket information memory unit 0303 is searched and referred by the data term inspection unit 0501, and the validity term of the ticket file for using the data is checked periodically or at a predetermined timing. If the validity term to use the data has expired, the data term inspection unit 0501 notifies the data elimination of the data to the client machine of the customer. The data elimination unit 0502 receives the signal for notifying the term expiration, and then eliminates the corresponding data of the corresponding customer, recorded in the data target memory unit 0205. The data term inspection unit 0501 can be equipped with the function to notify the client machine of the customer of the fact that the validity term is about to expire when such a fact occurs. Furthermore, the data term inspection unit 0501 can transmit the update information of the ticket file or the updated ticket file (changed in the format) to the client machine, and then update the ticket file retained by the customer, which will be described in detail later. Moreover, the updated ticket file can be transmitted to the client machine by the ticket issue unit 0201, which is not illustrate in the drawings. With such a function, the customer can assuredly eliminate the know-how data of its own, so the secrecy is guaranteed and the leakage of the secret data can be prevented.

FIG. 6 shows a function of prohibiting the access to the data, in regard to TYPE 2, when the ticket file is invalidated, with the example of the data use term.

In the TYPE 2, as in the TYPE 1, the use term is checked by the data term inspection unit 0501. When the term is judged to have expired according to the inspection result, the data term inspection unit 0501 transmits the notice of data read prohibition to the client machine of the customer through the network, and controls the read control unit 0206 by sending a read prohibition command. The read control unit 0206 to which the read prohibition command is transmitted prohibits the read access to the data source memory unit 0204. With such a function, the secrecy of data is guaranteed, since not only the access of the customer itself after the expiration of the term but also the access of others to the data source memory unit 0204 is prevented.

(3) Processing Flow of the Application Software Fee Imposition System.

Next, the processing flow of the application software fee imposition system according to the present invention is described in detail with reference to FIGS. 17 through 19. The stock control software is explained as an example of the application software, and the detailed description thereof is given with reference to FIGS. 1 through 23.

Figure 8:
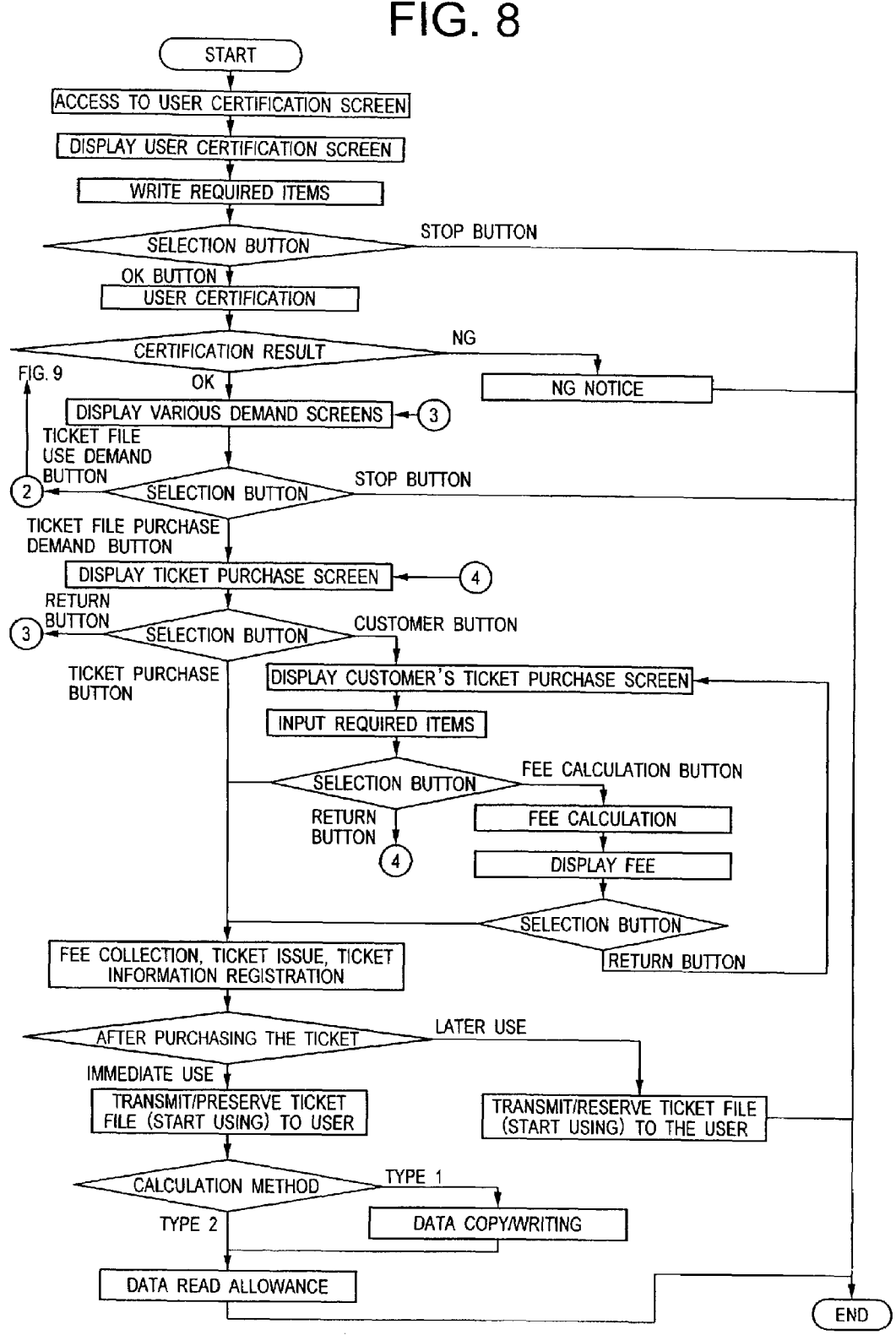
FIG. 8 is a flow chart showing the flow that a user uses the application software.

FIG. 8 is a flow chart showing the process of purchasing the ticket file issued by the ASP management center before using the application software. First, the customer has to get the ticket file of which fee has been set in advance according to the fee schedule set by the ASP management center, before using the application software.

In the processing flow shown in FIG. 8, the customer inputs required data such as a user identification or a password in the user certification screen as shown in FIG. 11, in order to be certified as the user of the ASP. As the customer is certified as a normal registered member (which means the OK sign in the certification result), the application software fee imposition system displays a proposal screen 1102 as shown in FIG. 11 to the output unit 0106 of the client machine. As the customer selects the button for requesting the purchase of the ticket file through the screen, a ticket file purchase screen as shown in FIG. 12 is displayed on the display unit 0106 of the client machine. The ticket file purchase screen shown in FIG. 12 displays names of the softwares to be used which are provided by the ASP management center, whether there is a designation of table which is a kind of data used by the application software, whether there is a restriction of record in the table, or a plurality of ticket files (standard ticket files) defined by the item of the start date or the term for using the ticket. The kind of data or the amount of data to be used by the customer is defined clearly by the table designation or the record restriction, and a fair fee can be suggested in using the ASP by reflecting such parameters. Further, in the present embodiment shown in FIG. 12, since the customer can select the calculation method (described below in detail), the application software can assuredly be executed on the time or term desired by the customer. In selling the ticket file, one ticket file can be sold, as well as a set of ten ticket files can be sold for example as shown in NO. 1. Furthermore, the seller shown in FIG. 12 can be the ASP management center or a selling agency, or an intermediating agency such as a manager of an e-Market Place eMP.

If there is a desired ticket file among the standard ticket files shown in FIG. 12, the customer selects the ticket file by pressing the ticket purchase button. As the customer completes the selection, the application software fee imposition system of the ASP management center processes the collection process of the fee, and the ticket files are issued by the ticket issue unit 0201 and sent to the client machine of the customer. As the ticket information memory unit 0303 registers the corresponding ticket files, the purchasing process is finished.

If there is no desired ticket file in the provided ticket files, the customer can selects a customer button shown in FIG. 12. A ticket purchase screen for use of the customers as shown in FIG. 13 is displayed on the output unit 0106 of the client machine, and the customer can determine the desired ticket files by filling up the requirement of the screen.

In FIG. 13, the customer selects the "stock control software" as the software desired by the customer, and selects the "history table" and the "assumption table" for the tables to use. The customer designates the area II (range from a to b) for the restriction of record, however, does not restrict the column. The record restriction can be set by the customer at its own will, or can be selected among the time ranges of area I, area II and area III provided by the ASP management center. Three areas are provided in the present embodiment, in which the areas are classified in consideration of the importance of the purpose in using the stock control system. Thus, the customer can select the area I if it wants to use the software with the purpose of verification of exactness of presumption, the area II with the purpose of stock estimate or a miner planning of stock control, and the area III with the purpose of major planning of stock control. Furthermore, the use term of the data target memory unit 0205 is designated to Apr. 12.

2001, and the update number of the data target memory unit 0205 is designated to ten. In the case of TYPE 1 shown in FIG. 2A, the data in the data source memory unit 0204 can be freely updated according to the use of the application software. The reason of restricting the update number is that the data used in executing the application software is the data stored in the data target memory unit 0205. Further, in the case of TYPE 2 shown in FIG. 2B, since data target memory unit 0205 does not exist, the designation of the data update number to ten means ten times of the allowances of the update of the data in the data source memory unit 0204 accessed in fact. By setting up such conditions, the fee for using the application software provided by the ASP can be imposed fairly, not only in consideration of the value of the used data and the importance and the value of the using purpose, but also mainly in consideration of the kind of data and the amount of data.

Meanwhile, the record restriction means, as shown in FIG. 19, to designate the range of records of the table at the time the ticket file is purchased, and to allow using the data within the range of the records enclosed by a thick borderline. The record restriction can be set to every table.

The 'calculation method' shown in FIG. 13 is a method performed by a plurality of server machines of the ASP management center in order to guarantee the achievement of the execution result of the application software in a time period desired by the customer. The construction of the hardware of the server machines is shown in FIG. 7.

In the present embodiment, there are prepared three kinds of the calculation method, i.e. the calculation method 1A, the calculation method 1B and the calculation method 2. The calculation methods 1A and 1B are realized by the server machines adopting the TYPE 1 which is the method of copying the aforementioned data, and the server machines in such a situation correspond to the server machines $\alpha$, $\beta$, $\gamma 1$ and $\gamma 2$. Further, the calculation method 2 is realized by the server machines adopting the TYPE 2, and the server machines in such a situation correspond to the server machines $\alpha$ and $\beta$.

The calculation method 1A is a exclusive reservation method that a customer can use one or more server machines $\gamma$ exclusively. If the customer wants the calculation method 1A, the reservation status screen showing the reservation state of the server machine $\gamma$ is displayed on the output unit 0106 of the client machine, and the customer can select the item that remains as 'no reservation'. When such a calculation method is used, since the server machine $\gamma$ is not used by any other customers, the application software can be executed in a certain time assuredly. Further, if the calculation method 1A is selected, although the exclusive server machine $\gamma$ is used on the reserved date or during the reserved term, according to the selection of the customer, the application software can be used according to the calculation method 2 described below during the term other than the reserved date or the reserved term. In that situation, the conversion to the calculation method 2 can be achieved by providing a separate conversion unit (which is not shown in the figures) for converting the calculation method.

The calculation method 1B is a method for executing the application software using the server machines $\gamma$ which are not reserved by the calculation method 1A in principle. If there occurs many occasions of 'reservation completion', the processing speed of the executed application software is not guaranteed, however, if there are many 'no reservation', a high-speed processing is possible due to the parallel calculation of the plurality of server machines $\gamma$. Further, in the calculation method 1B, if the server machines $\gamma$ are busy by the occupation of other customers, the calculation method can be converted by the conversion unit (not shown) to the calculation method 2 described below. The conversion unit detects the complexity of the server machines $\gamma$ and the server machine $\beta$, and converts the calculation method under a predetermined condition. The conversion unit re-converts the calculation method into the calculation method 1B under another predetermined condition. With such a conversion function, the customer who has selected the calculation method 1B is provided with an optimal and flexible calculation environment under the restriction of reservation status of the server machines $\gamma$. In the aspect of functions, the calculation method 1B guarantees at least the operation of the calculation method 2 described below. Even when the calculation method 1B is desired, the screen shown in FIG. 14 is displayed to the customer before the selection, and accordingly, the customer can refer to the reservation status on the desired date to use the application software.

The calculation method 2 is for executing the application software while a plurality of customers commonly use the server machine $\beta$ shown in FIG. 7. Compared with the above calculation method, it provides a low speed in general, however, it can provide the service with a low fee. If the calculation method 2 is selected and requested, the application software is always executed according to the calculation method 2.

In FIG. 7, the server machine $\beta$ has the data source memory unit 0204, and the server machines $\gamma$ have the data target memory unit 0205, however, according to the present invention, the data source memory unit 0204 can be installed in the server machines $\gamma$. Furthermore, in such a case, the data copy/writing unit 0203 is included in the server machines $\gamma$. In FIG. 7, the server machine a functions as an ASP management server, independently of the server machines $\beta$ and $\gamma$ for performing the calculation process of the application software. The server machine a performs the issue, the registration and the inspection of the ticket files, and the elimination of the data, which have been illustrated by referring to FIGS. 2 through 6.

Meanwhile, the present embodiment illustrates the case that three kinds of calculation methods are provided by the ASP management center, however, the calculation method is not limited to those three kinds. Moreover, the data access types (the TYPE 1 and the TYPE 2 shown in FIG. 2B) don't have to correspond to the calculation methods (the calculation method 1A, the calculation method 1B and the calculation method 2). In the present embodiment, the example that "Jan. 5, 2001 $\gamma 1$ reservation" according to the calculation method 1A is selected is illustrated. That means that the server machine $\gamma 1$ executes the stock control software at Jan. 5, 2001. The data used by the software and the data of the processing result are preserved by Apr. 12, 2001.

As described above, the purchase of the ticket file completes, as the desired items are input through the ticket purchase screen provided to the customer as shown in FIG. 13 and then the button for purchasing the ticket is pressed in the displayed screen (See FIG. 8). As the purchasing has completed, the collecting of fee imposed by the application software fee imposition system is performed, and the electrical ticket file as shown in FIG. 16 is issued and then is sent to the customer. And the information of the corresponding ticket files is recorded in the auxiliary memory unit 0104 and the ticket information memory unit 0303 (See FIG. 8)

In the ticket purchase screen provided for the user, the fee can be calculated before determining the purchase of the ticket (See FIGS. 8 and 13). The result of fee calculation is shown in FIG. 15.

Next, the processing flow of utilizing the purchased ticket file is illustrated.

In order to use the ticket file, that is, to use the application software such as the stock control software, the user certification has to be processed as described above just after the purchase of the ticket file (See FIG. 8). In this situation, the ticket file updated by the use thereof is sent to the client machine of the customer (See FIG. 8). If the ticket file is to be used after the customer log-outs once, the customer has to select the button for proposing the use of the ticket file at the proposal screen 1102 shown in FIG. 11 in order to begin the process of the use proposal. The processing flow in such a case is described in detail with reference to FIGS. 9, 17 and 18.

Figure 17:
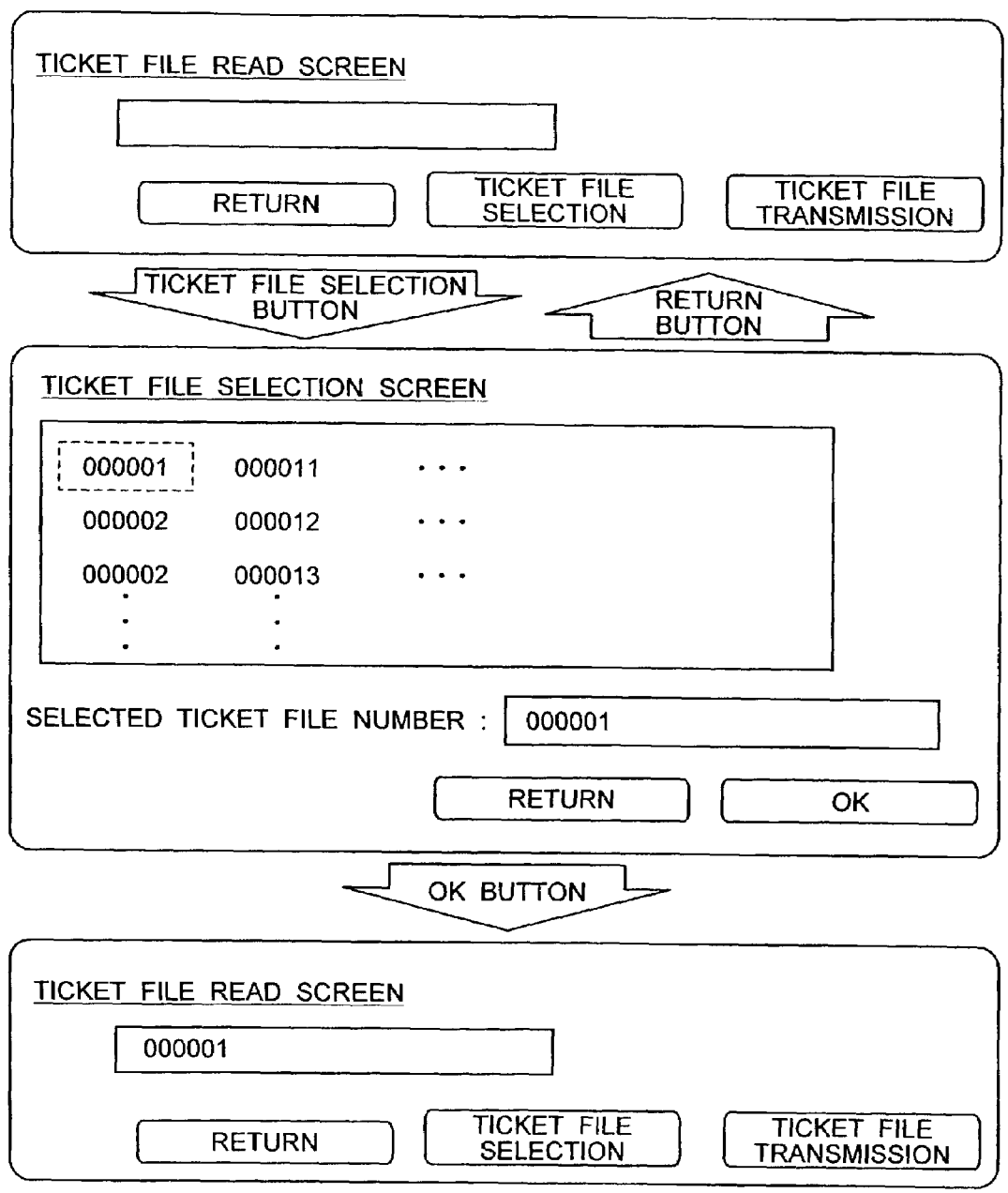
FIG. 17 shows an output screen displayed when a customer transmits the ticket file.

As the button shown in FIG. 11 for proposing the use of the ticket file is selected, the ticket file read screen as shown in the upper area of FIG. 17 is displayed on the output unit 0106 of the client machine. If the ticket file to be used is not determined, a ticket file selection screen as shown in the middle area of FIG. 17 is displayed on the output unit 0106 as the ticket file selection button is pushed. When the customer selects "000001" (which is the ticket file shown in FIG. 16) among the numbers of the ticket files, the ticket file of the number "000001" is specified in the ticket file read screen (See FIG. 9).

Figure 9:
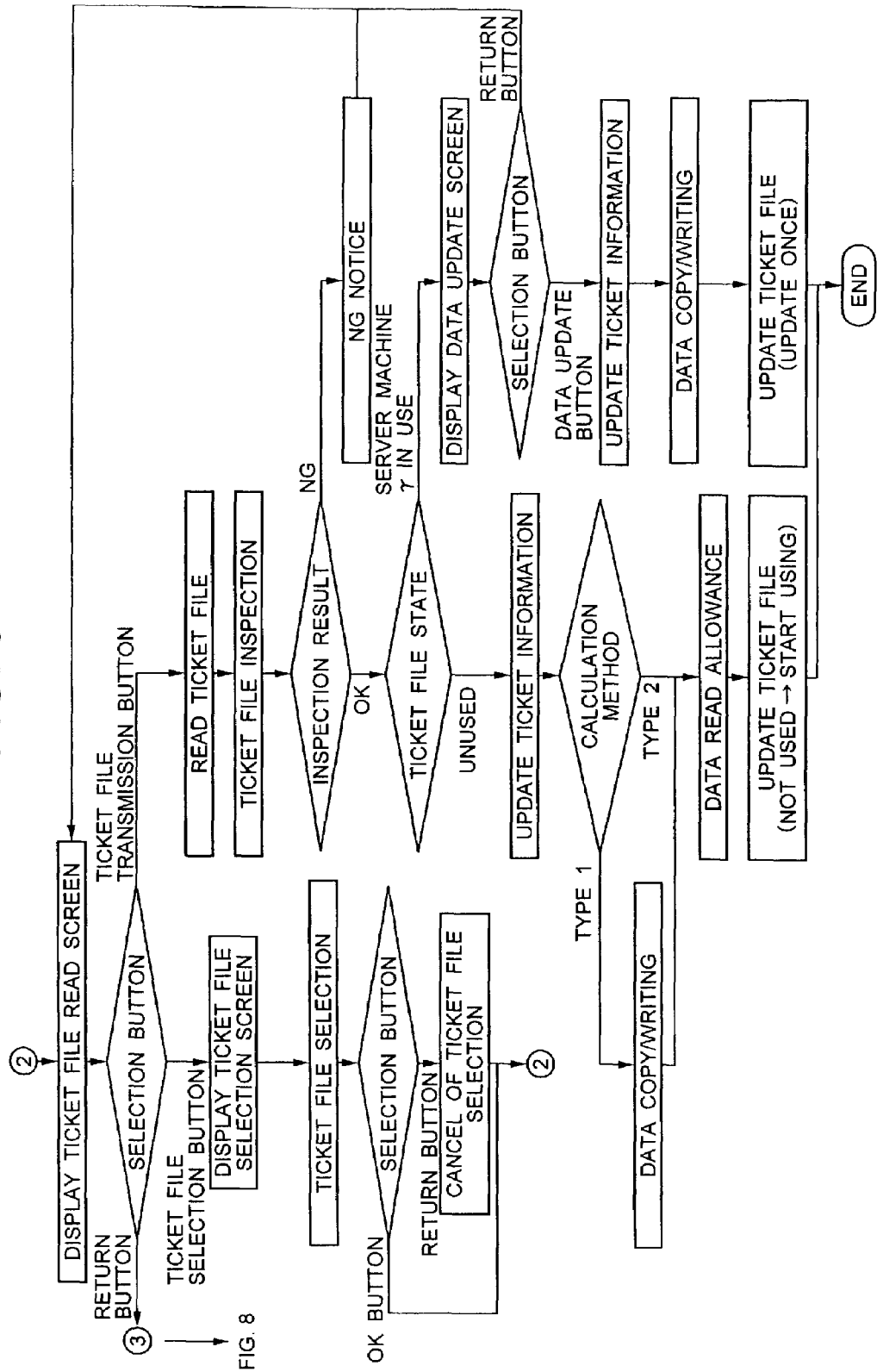
FIG. 9 is a flow chart showing the update process of the ticket file.

If the ticket file transmission button is pushed as the next step, the corresponding ticket file is transmitted to the server machine of the ASP through the network, and then the ticket file is read (See FIG. 9). Then, the application software fee imposition system performs the inspection of the ticket file as illustrated with reference to FIGS. 3 and 4, and the inspection of the state of the ticket file. (See FIG. 9). If the state of the ticket file is 'unused', the ticket file is updated to 'use', and then is recorded in the ticket information memory unit 0303. And then the data copy/writing process or the data read allowance process is performed in accordance with the calculation method designated by the ticket file, and the application software such as the stock control software is executed. Further, as shown in the flow chart of FIG. 9, if the state of the ticket file is detected as 'being used' or 'having been used', the customer can select whether the data in the data target memory unit 0205 is updated according to the execution result of the previous execution of the application software. The reason is to make it possible to execute the application software according to the recent data or the data of high exactness. More particularly, in order to update the data of the data target memory unit 0205 with respect to the ticket file numbered at "000002", a data update screen as shown in FIG. 18 is displayed on the output unit 0106 of the client machine, and the data update is performed by the data copy/writing after receiving the update command from the customer. In consistence with the data update, the remaining update number of the ticket file is updated from ten to nine. The updated ticket file is recorded in the ticket information memory unit 0303, and the same ticket file is transmitted to the client machine through the network. FIG. 9 shows the data update method according to the TYPE 1 shown in FIG. 1, however, the data update according to the TYPE 2 can be realized by updating the contents in the data source memory unit.

Figure 10:
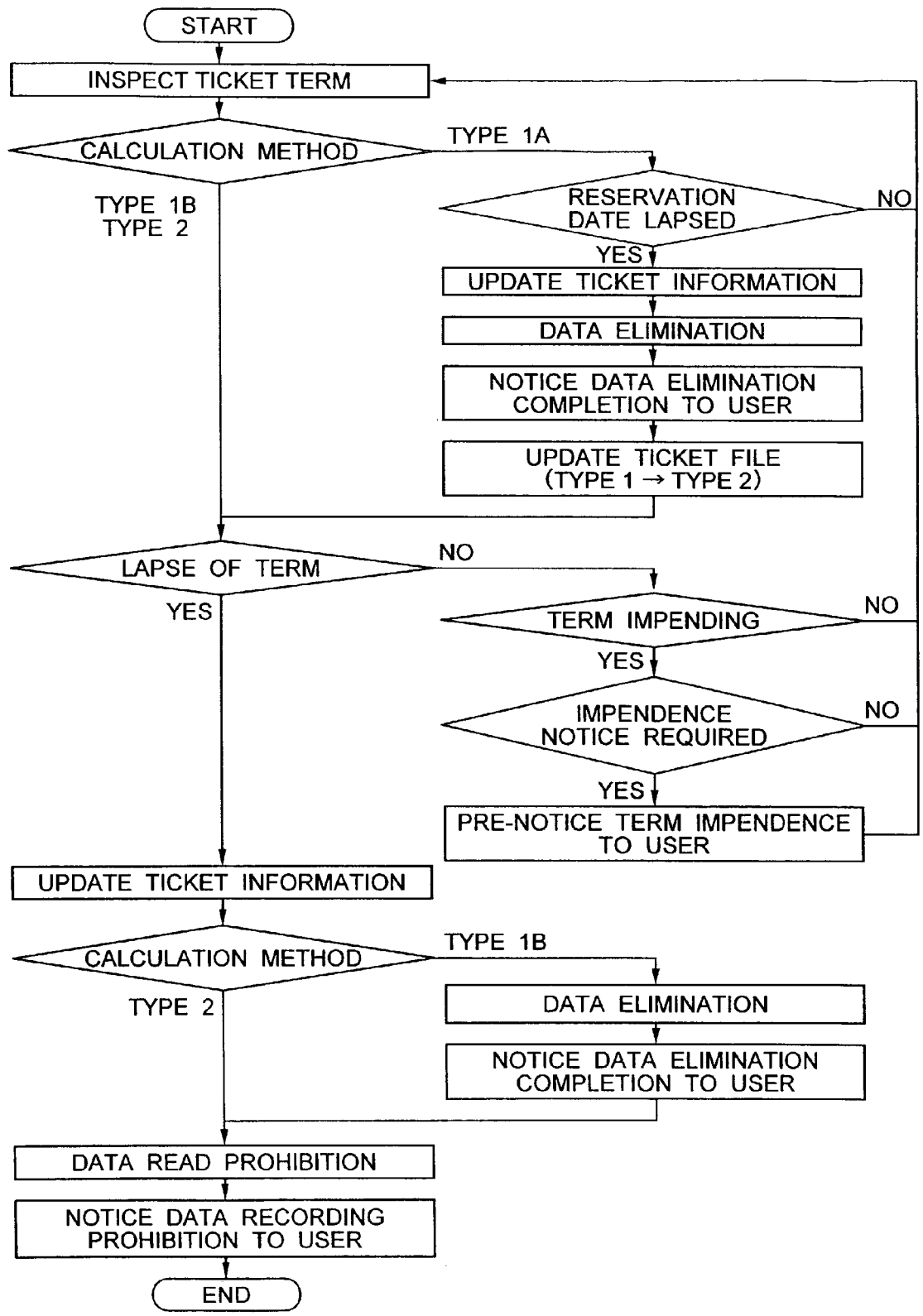
FIG. 10 is a flow chart showing the data access restriction process according to the term designated on the ticket file.

Next, with reference to FIG. 10, a method is illustrated for prohibiting the access to the data or the elimination of the data while using the application software such as the stock control software.

The application software fee imposition system has a data term inspection unit 0501 for inspecting the term for using the ticket file. At first, the data term inspection unit 0501 judges the calculation method designated by the ticket file.

In case of the calculation method 1A, the data term inspection unit 0501 inspects whether the reservation date has lapsed. If the reservation date has lapsed, the ticket information memory unit 0303 is updated, and the data elimination unit 0502 eliminates the data of the data target memory unit 0205. In such a situation, if a data use term is designated in the corresponding ticket file in addition to the reservation date, the calculation method 1A is converted to the calculation method 2 so that the application software can be used during the corresponding term with the corresponding data.

In case of the calculation method 1B or the calculation method 2, the data term inspection unit 0501 inspects whether the data use term has lapsed. If the term has lapsed, the information of the ticket information memory unit 0303 is updated, and a data read prohibition or a data elimination is performed according to the respective methods. If not the lapse of the term but the impendence of the term is detected, the impendence of the term is notified to the customer through the network.

As the data elimination is performed in such a manner, it is possible to judge the validity of the ticket file and enhance the secrecy of the customer data, and the ASP manager can provide the safe use of the application software such as the stock control software.

Hereinafter, the stock control software which is one of the ERP package softwares is described.

In case the stock control software is used as the application software provided by the ASP, the hardware shown in FIG. 1 is used in executing the application software. The processing unit 0103 shown in FIG. 1 performs the calculation process of the stock control software. The auxiliary memory unit 0104 records a stock-related data 0218 such as a storage/delivery history table 2301, an ordering history table 2302 and a component management master table 2303 which will be described later, and a stock control software program.

In the embodiment of the application software fee imposition system, since the auxiliary memory unit 0104 is included in the server machine of the ASP manager, the stock-related data or various judging rules are recorded in the data source memory unit 0204 for usage. And, the stock control software can be used under the restriction designated by the ticket file that the user purchased, such as the table designation, record restriction, or the column restriction. As the data use types of the data source memory unit 0204, there are the TYPE 1 and the TYPE 2, described before.

Figure 23:
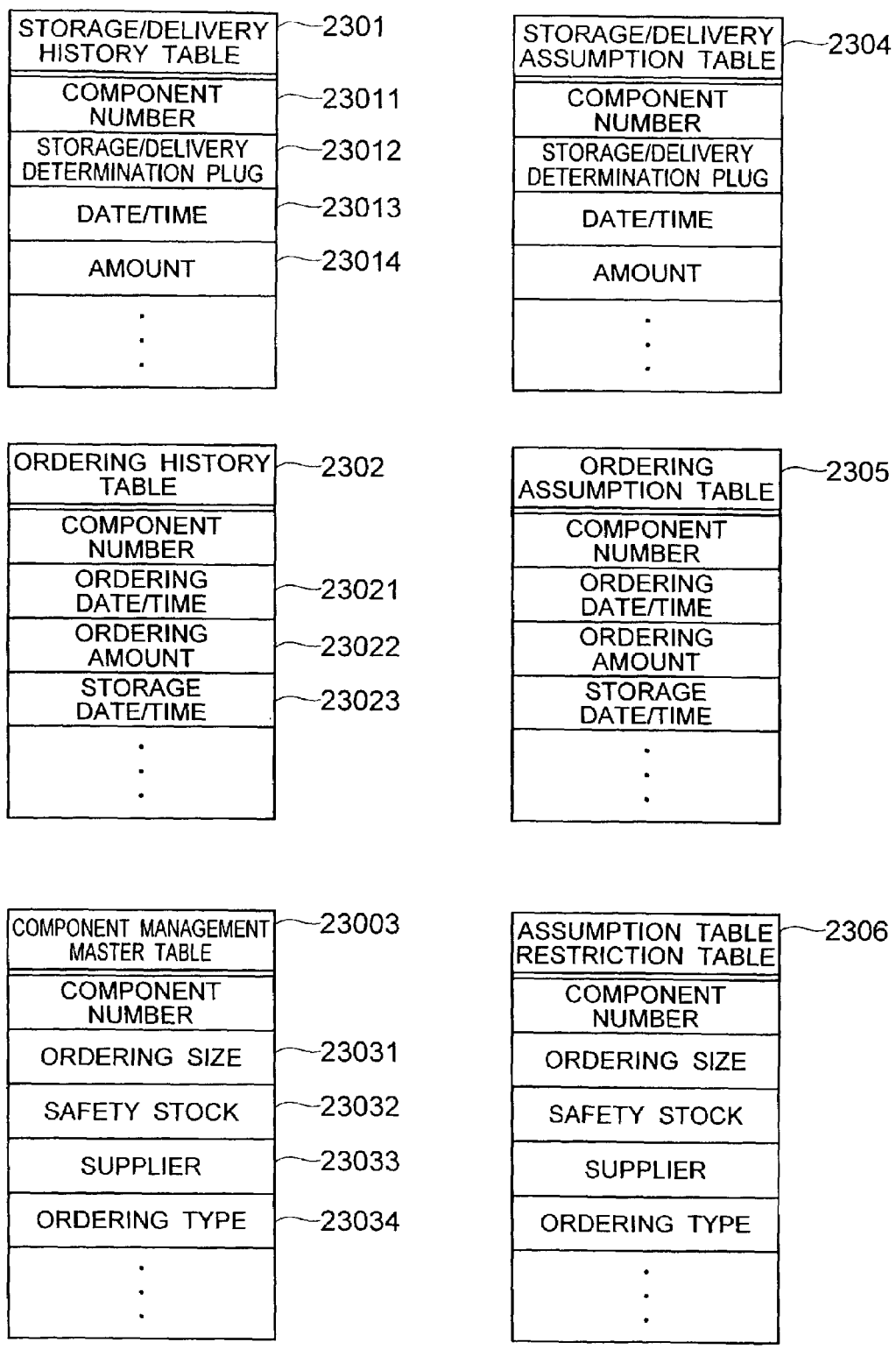
FIG. 23 is a schematic diagram of a table structure stored in the memory part for storing the stock-related data.

Here, the stock-related data is the information about a storage amount or storage date and time, and the information showing the management state of the repaired component or the reference of stock management such as a component number, and an ordering size or a safety stock. More particularly, the stock-related data includes, as shown in FIG. 23, a storage/delivery history table 2301, an ordering history table 2302, a component management master table 2303, a storage/delivery assumption table 2304, an ordering assumption table 2305 and an assumption table restriction table 2306.

The storage/delivery history table 2301 and the storage/delivery assumption table 2304 have a component number column 23011, a storage/delivery determination program 23012, a date/time column 23013 and an amount column 23014. In the component column 23011, number information for specifying the component is recorded. In the storage/delivery determination program 23012, the information for distinguish the storage of goods from the delivery of goods is recorded. In the date/time column 23013, date/time information such as the storage date and time or the delivery date and time is recorded. In the amount column 23013, the storage amount or the delivery amount which is to be processed or has been processed at the date and time recorded in the date/time column 23013 is recorded. The ordering history table 2302 and the ordering assumption table 2305 have an ordering date/time column 23031, an ordering amount column 23022 and the storage date/time column 23023. The component management master table 2303 and the assumption table restriction table 2306 have an ordering size column 23031, a safety stock column 23032, a supplier column 23033 and an ordering type column 23034.

Further, in the storage/delivery history table 2301 and the ordering history table 2302, the data about the history (history data) of a storage amount, a delivery amount and a stock amount, which have occurred from the past to the current time actually, are recorded. Meanwhile, in the storage/delivery assumption table 2304 and the ordering submission table 2305, the data about a storage amount (assumption data), a delivery amount and a stock amount, which have occurred by the assumption data memory process, are recorded. In the component management master table 2303, the information showing the management state of the component or the stock reference, such as a component number used currently, an ordering size and safety stock, is recorded. And, in the assumption table restriction table 2306, a restriction condition assumed by the user, which is used in making the assumption data, is recorded.

Next, the processing flow performed in the processing unit 0103 of the present invention is illustrated. After purchasing the ticket file, the user can use the stock control software provided by the ASP. In the present embodiment, after the purchasing process of the ticket file as shown in FIG. 8, the certification process is performed by the ticket file inspection unit 0302, and the process for preparing the stock control software which is described below can be performed according to the contents of ticket file.

(1) a process for determining a proper amount of the stock
(2) a process for diagnosing the state of the stock
(3) a process for calculating the deficiency/surplus amount of the stock
(4) a process for making the method of improving the stock In such processes, a certain parameter is generated with reference to the history data about the stock from the past to the current time, and a method for determining or improving the proper amount of stock at the current time can be drafted. Furthermore, a method for determining or improving the proper amount of stock at a specific time in the future can be drafted, by using the assumption data about the stock from the current time to the specific time in the future. In such a case, the kind of the data, in other words, the value of the data, used by the customer is different according to the processes, so the imposition of fee depends on the data.

Figure 20:
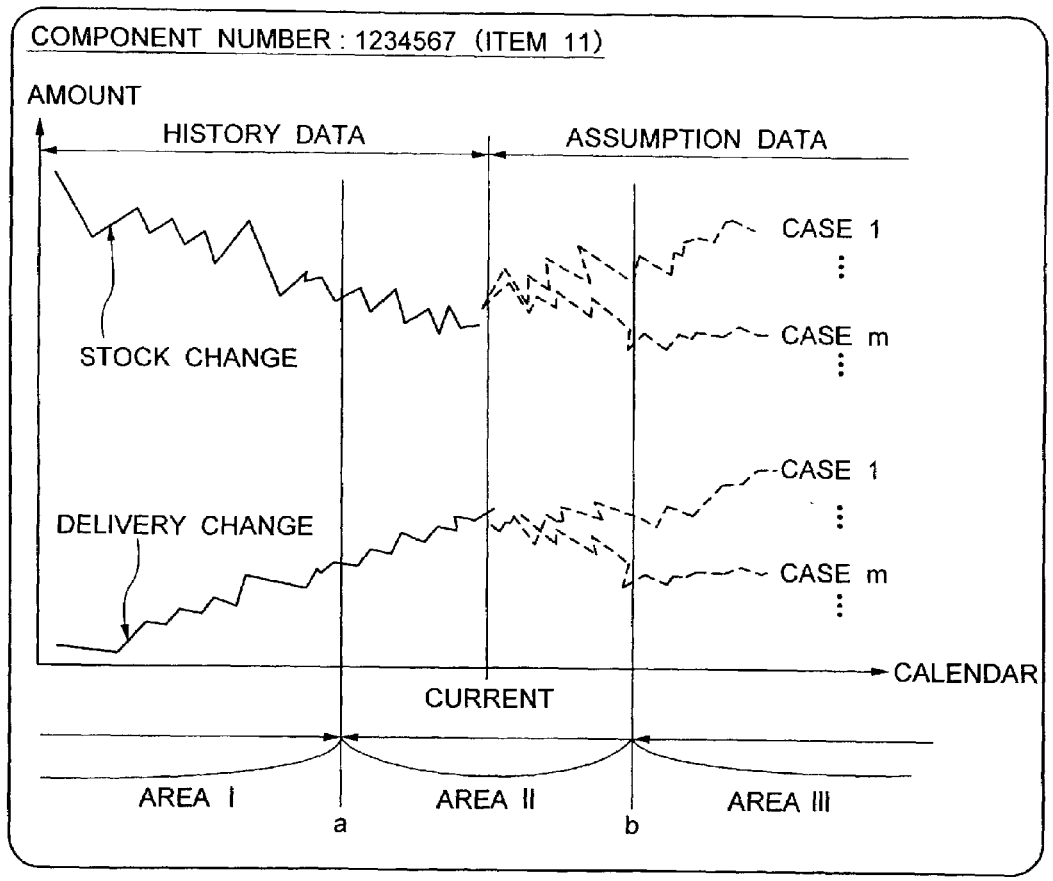
FIG. 20 shows an example of stock-related data used in stock control software, and an example of fee schedule according to the purpose of use.

The graph in FIG. 20 shows an example of the history data and the assumption data about the change of the stock and the change of the delivery. The history data is one kind of data because it is a result data, however, the assumption data can constitute plural kinds of events (1 through m) depending on the difference of the restriction condition assumed by the customer or the improving plan performed at the current time. The customer can use any kind of event according to its assumption.

Further, in the graph shown in FIG. 20, the relationship of the history data and the assumption data with respect to the area I, area II and area III is shown. The customer can designate an area (record area) pre-set by the ASP management center at the time the ticket is purchased, and the ASP management center can impose the fee according to the area designation. An example of imposing the fee is shown in the table of FIG. 20. The data area unit fee shown in FIG. 20 is made on the basis of imposing method according to the purpose of using of the customer, in which the area I is set to 0.36 yen per record, the area II is set to 1.01 yen per record, and the area III is set to 0.63 yen per record.

Figure 21:
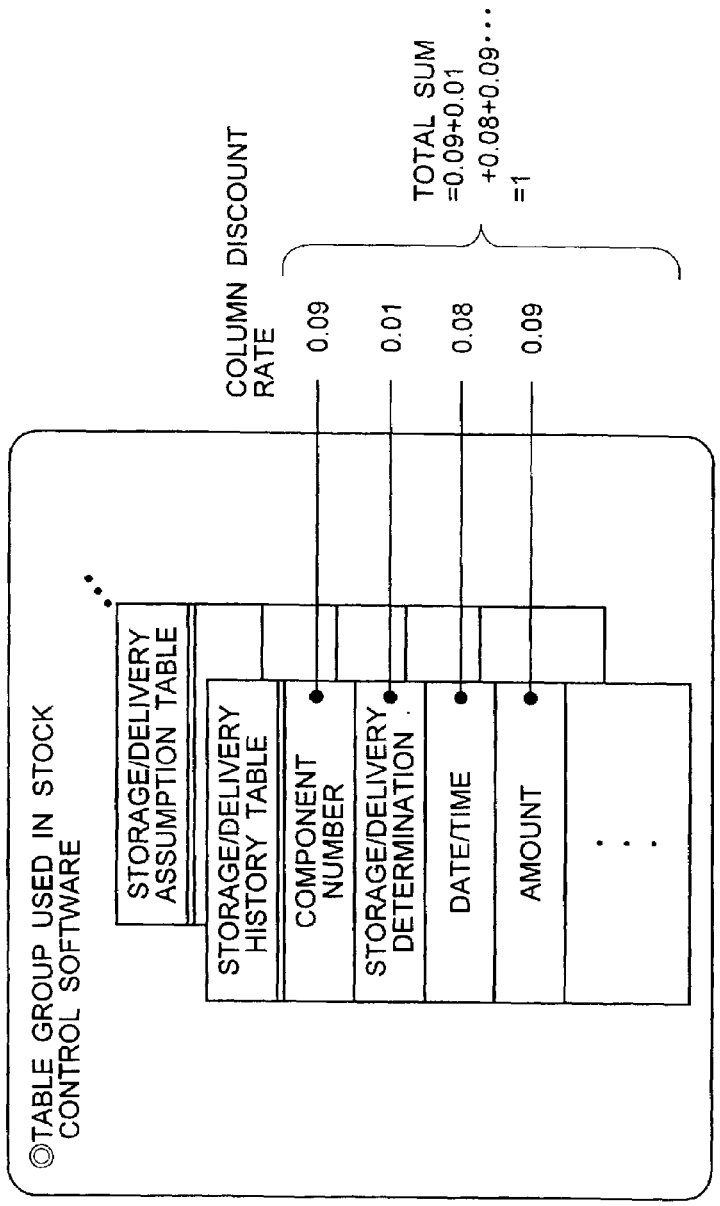
FIG. 21 shows an example of fee schedule in regard to a column restriction when the stock control software is used.

FIG. 21 shows an example of the fee imposition according to the column restriction. Although one table is comprised of a plurality of columns, the customer can select a column that he wants to use or he doesn't want to use. For example, as shown in the figure, the ASP management center sets a discount ratio, so that the component number column of the storage/delivery history table is 0.09, the column of the storage/delivery determination graph is 0.01, the date/time column is 0.08, and the storage/delivery amount column is 0.09. When purchasing the ticket file, the customer can designate a specific column which is not used, and the ASP management center can impose the fee according to the value of using the columns, (that is, the data according to the columns). The imposed fee according to the record restriction and the column restriction is calculated by using the discount ratio of the columns which are not used, for example, by the equation expressed as "unit fee of data area×the number of records× (1−total amount of the discount ratio of columns)".

Furthermore, in calculating the imposed fee, it is possible to consider the machine performance as shown in FIG. 22 or the number of data update. In the fee calculation using such a manner, the value of the used hardware or the frequency of using the hardware is considered. Further, the fee calculation considering the existence of the term impendence notice is possible, which is the method for considering the service and realizing the fair imposition according to the service.

According to the present invention, the software providing company can collect the fee without fail and charge a fair fee to the customer, and the customer can use the application software according to the paying method easy to estimate.

It should be further understood by those skilled in the art that the foregoing description has been made on embodiments of the invention and that various changes and modifications may be made in the invention without departing from the spirit of the invention and scope of the appended claims.

What is claimed is:

1. A method for providing use by a customer of application software in a network connecting a server of a provider who performs the application software to provide services and a client machine of the customer for the application software comprising the steps of:

receiving inputs of a name of software that the customer wants to use, at least a name of a table that the customer wants to use while using the software, and a data use term, from the client machine;

calculating a fee by a processing unit on the basis of a predetermined fee schedule in accordance with the software, a kind of the table and the data use term and sending the calculated fee to the client machine;

collecting the fee and issuing a ticket file after receiving an input by the customer for purchasing the ticket file;

transmitting the ticket file to the client machine; and receiving the ticket file from the customer and checking whether or not the ticket file is available, when the customer uses the application software based on the issued ticket file;

copying data of the table designated by information indicated by the ticket file from a data source memory unit and writing the data of the table on a data target memory unit, when the ticket file is available; and performing the application software by using the data written in the data target memory unit and transmitting the performed result to the client machine.

2. A method as claimed in claim 1,
wherein, the input receiving step comprises receiving an input about a designation of a record range or a data amount in regard to the table that the customer wants to use,
wherein, the fee calculating step calculates the fee in accordance with the designation of the record range or the data amount, and
wherein, the ticket file issuing step comprises issuing the ticket file recording information about the designation of the record range or the data mount.

3. A method as claimed in claim 1,
wherein, the input receiving step comprises receiving a desired maintenance period for maintaining a recorded state of the table used by the customer on the data target memory unit,
wherein, the fee calculating step calculates the fee in accordance with the desired maintenance period, and
wherein, the ticket file issuing step issues the ticket file recording information about the desired maintenance period.

4. A method as claimed in claim 1, further comprising the steps of:
updating the ticket file according to a data update number in case a data in the data source memory unit is updated by execution of the software; and
recording the updated ticket file on a ticket information memory unit, and simultaneously, transmitting the updated ticket file to the client machine.

5. A method as claimed in claim 1,
wherein, the input receiving step comprising receiving an input of a calculation method of the application software selected by the customer, said calculation method being one of a calculation method which the customer can reserve a specific server machine and use the specific server machine exclusively and a calculation method which the customer shares another server machine,
wherein, the calculating step calculates the fee in accordance with the selected calculation method, and
wherein, the ticket file issuing step issues the ticket file recording information about the selected calculation method.

6. A method for providing use by a customer of application software in a network connecting a server of a provider who performs the application software to provide services and a client machine of the customer for the application software, comprising the steps of:
receiving inputs of a name of software that the customer wants to use, at least a name of a table that the customer wants to use while using the software, and a data use term, from the client machine;
calculating a fee by a processing unit on the basis of a predetermined fee schedule in accordance with the software, a kind of the table and the data use term and sending the calculated fee to the client machine;
collecting the fee and issuing a ticket file after receiving an input by the customer for purchasing the ticket file;
transmitting the ticket file to the client machine;
receiving the ticket file from the customer and checking whether or not the ticket file is available, when the customer uses the application software based on the issued ticket file; and
controlling a read of data in the table designated by information of the ticket file, with respect to a data source memory unit storing a plurality of tables, when the ticket file is available, and performing the application software to transmit the performed result to the client machine.

7. A method as claimed in claim 6,
wherein, the input receiving step comprises receiving an input about a designation of a record range or a data amount in regard to the table that the customer wants to use,
wherein, the fee calculating step calculates the fee in accordance with the designation of the record range or the data amount, and
wherein, the ticket file issuing step comprises issuing the ticket file recording information about the designation of the record range or the data mount.

8. A method as claimed in claim 6,
wherein, the input receiving step comprises receiving a desired access period for accessing the data of the table recorded on the data source memory unit,
wherein, the fee calculating step calculates the fee in accordance with the desired access period, and
wherein, the ticket file issuing step issues the ticket file recording information about the desired access period.

9. A method as claimed in claim 6, further comprising the steps of:
updated the ticket file according to a data update number in case a data in the data source memory unit is updated by execution of the software; and
recording the updated ticket file on a ticket information memory unit, and simultaneously, transmitting the updated ticket file to the client machine.

10. A method as claimed in claim 6,
wherein, the input receiving step comprising receiving an input of a calculation method of the application software selected by the customer, said calculation method being one of a calculation method which the customer can reserve a specific server machine and use the specific server machine exclusively and a calculation method which the customer shares another server machine,
wherein, the calculating step calculates the fee in accordance with the selected calculation method, and
wherein, the ticket file issuing step issues the ticket file recording information about the selected calculation method.

* * * * *